US009760619B1

(12) United States Patent
Lattanzi et al.

(10) Patent No.: US 9,760,619 B1
(45) Date of Patent: Sep. 12, 2017

(54) GENERATING WEIGHTED CLUSTERING COEFFICIENTS FOR A SOCIAL NETWORK GRAPH

(71) Applicant: Google Inc., Mountain View, CA (US)

(72) Inventors: Silvio Lattanzi, New York, NY (US); Stefano Leonardi, New York, NY (US)

(73) Assignee: Google Inc., Mountain View ( * ) Notice: Subject to any disclaimer, the term of this patent is extended or adjusted under 35 U.S.C. 154(b) by 270 days.

(21) Appl. No.: 14/279,200

(22) Filed: May 15, 2014

Related U.S. Application Data

(60) Provisional application No. 61/986,006, filed on Apr. 29, 2014.

(51) Int. Cl.
*G06F 17/30* (2006.01)
*G06F 17/00* (2006.01)

(52) U.S. Cl.
CPC .. *G06F 17/30598* (2013.01); *G06F 17/30958* (2013.01)

(58) Field of Classification Search
CPC .... G06Q 50/01; G06Q 10/10; G06Q 30/0201; G06Q 10/00; G06Q 30/02; G06Q 30/024; G06Q 10/04; G06Q 10/107; G06Q 30/0255; G06Q 10/063; G06Q 10/0635; G06Q 10/0637; G06Q 10/105; G06Q 10/1053; G06Q 20/4016; G06Q 30/0202; G06Q 30/0241
See application file for complete search history.

(56) References Cited

U.S. PATENT DOCUMENTS

| | | | |
|---|---|---|---|
| 6,640,218 B1 * | 10/2003 | Golding | G06F 17/30867 |
| 7,610,367 B2 | 10/2009 | Canright et al. | |
| 7,739,211 B2 | 6/2010 | Coffman et al. | |
| 8,386,574 B2 | 2/2013 | Chidlovskii et al. | |
| 8,446,842 B2 | 5/2013 | Cao et al. | |
| 2013/0013549 A1 * | 1/2013 | Chang | G06Q 10/00 706/48 |
| 2013/0290226 A1 | 10/2013 | Dokken | |
| 2014/0195984 A1 * | 7/2014 | Aslam | G06Q 50/265 715/853 |
| 2015/0178406 A1 * | 6/2015 | Hong | G06F 17/30312 707/752 |

(Continued)

OTHER PUBLICATIONS

Backstrom et al., "Group Formation in Large Social Networks: Membership, Growth, and Evolution", 2006 (11 pages).

(Continued)

*Primary Examiner* — Yicun Wu
(74) *Attorney, Agent, or Firm* — Patent Law Works LLP

(57) ABSTRACT

The disclosure includes a system and method for generating weighted clustering coefficients for a social network graph. The system includes a processor and a memory storing instructions that when executed cause the system to: receive social graph data associated with a social network, the social graph data including nodes, edges that connect the nodes and weights associated with the edges in a social graph, determine a first probability of existence of an edge in the social graph based on the weights, determine a second probability that a first node forms a triangle with two neighbor nodes, and compute a weighted clustering coefficient for the first node based on the first and second probabilities.

20 Claims, 13 Drawing Sheets

(56) References Cited

U.S. PATENT DOCUMENTS

2015/0188783 A1* 7/2015 Shivashankar .... G06Q 30/0241 709/224

OTHER PUBLICATIONS

Bar-Yossef et al., "Reductions in Streaming Algorithms, With an Application to Counting Triangles in Graphs", 2002 (10 pages).
Barrat et al., "The Architecture of Complex Weighted Networks", 2004 (6 pages).
Becchetti et al., "Efficient Semi-Streaming Algorithms for Local Triangle Counting in Massive Graphs", 2008 (9 pages).
Bloznelis, "Degree and Clustering Coefficient in Sparse Random Intersection Graphs", 2013 (37 pages).
Bollobas, "Mathematical Results on Scale-Free Random Graphs", 2003 (38 pages).
Buriol et al., "Counting Triangles in Data Streams", 2006 (10 pages).
Castillo et al., "A Reference Collection for Web Spam", 2006 (14 pages).
Dean et al., "MapReduce: Simplified Data Processing on Large Clusters" 2004 (26 pages).
Godehardt et al., "Clustering Coefficients of Random Intersection Graphs" 2012 (11 pages).
Hardiman et al., "Estimating Clustering Coefficients and Size of Social Networks via Random Walk", 2013 (11 pages).
Heath et al., "Generating Random Graphs with Tunable Clustering Coefficients" 2011 (11 pages).
Jowhari et al., "New Streaming Algorithms for Counting Triangles in Graphs", 2005 (7 pages).
Kalna et al., "Clustering Coefficients for Weighted Networks", 2006 (7 pages).
Kalna et al., "A Clustering Coefficient for Weighted Networks, with Application to Gene Expression Data", 2007 (9 pages).
Kwak et al., "What is Twitter, a Social Network or a News Media?", 2010 (10 pages).
Latapy, "Main-Memory Triangle Computations for Very Large (Sparse (Power-Law)) Graphs", 2008 (22 pages).
Leskovec et al., "Planetary-Scale Views on a Large Instant-Messaging Network", 2008 (28 pages).
Lopez-Fernandez et al., "Applying Social Network Analysis to the Information in CVS Repositories", May 2004 (18 pages).
Onnela et al., "Intensity and Coherence of Motifs in Weighted Complex Networks", 2005 (5 pages).
Opsahl et al., "Clustering in Weighted Networks", 2009 (9 pages).
Pagh et al., "Colorful Triangle Counting and a Mapreduce Implementation", 2012 (8 pages).
Pavan et al., "Counting and Sampling Triangles from a Graph Stream", 2012 (12 pages).
Pfeiffer III, et al., "Methods to Determine Node Centrality and Clustering in Graphs with Uncertain Structure", 2011 (9 pages).
Saramaki et al., "Generalizations of the Clustering Coefficient to Weighted Complex Networks", 2007 (4 pages).
Schank et al., "Approximating Clustering Coefficient and Transitivity", 2005 (8 pages).
Schank et al., "Finding, Counting and Listing all Triangles in Large Graphs, an Experimental Study", 2005 (4 pages).
Suri et al., "Counting Triangles and the Curse of the Last Reducer", 2011 (8 pages).
Tsourakakis et al., "Doulion: Counting Triangles in Massive Graphs with a Coin", 2009 (9 pages).
Tsourakakis et al., "Triangle Sparsifiers", 2011 (24 pages).
Watts et al., "Collective Dynamics of Small-World Networks", 1998 (39 pages).
Yang et al., "Uncovering Social Network Sybils in the Wild", 2011 (7 pages).
Zhang et al., "A General Framework for Weighted Gene Co-Expression Network Analysis", 2005 (45 pages).
Zhang et al., "Analytic Solution to Clustering Coefficients on Weighted Networks", 2009 (9 pages).

* cited by examiner

GENERATING WEIGHTED CLUSTERING COEFFICIENTS FOR A SOCIAL NETWORK GRAPH

CROSS REFERENCE TO RELATED APPLICATIONS

This application claims the benefit under 35 U.S.C. §119 (e) of U.S. Provisional Application No. 61/986,006, entitled "Generating Weighted Clustering Coefficients for a Social Network Graph" filed on Apr. 29, 2014, the entire contents of which are incorporated herein by reference.

BACKGROUND

The specification relates to assessing the quality of nodes in a social network. More specifically, the specification relates to generating weighted clustering coefficients for a social network graph to quantify how tightly interconnected a community is around a node.

In social networks, nodes may be tightly associated with other nodes or groups of nodes. For example, a rock star is followed by lots of fans or a popular school teacher is surrounded by students and parents on a social network. A clustering coefficient has been extensively used to measure the degree to which nodes in a social network cluster together. However, computing the clustering coefficient can be challenging. The computation of the clustering coefficient requires counting the number of triangles in a social network, which can be hard to implement on a large-scale social network graph. Additionally, a systematic study of the clustering coefficient of weighted networks has not yet been undertaken. Current approaches mainly compute the clustering coefficient of an unweighted network, and therefore neglect the intensity of the interaction between nodes that is usually represented with weights on edges of the social network graph and that measures the statistical cohesiveness of the social network.

SUMMARY

According to one innovative aspect of the subject matter described in this disclosure, a system for generating weighted clustering coefficients for a social network graph includes a processor and a memory storing instructions that, when executed, cause the system to: receive social graph data associated with a social network, the social graph data including nodes, edges that connect the nodes and weights associated with the edges in a social graph, determine a first probability of existence of an edge in the social graph based on the weights, determine a second probability that a first node forms a triangle with two neighbor nodes and compute a weighted clustering coefficient for the first node based on the first and second probabilities.

In general, another innovative aspect of the subject matter described in this disclosure may be embodied in methods that include: receiving social graph data associated with a social network, the social graph data including nodes, edges that connect the nodes and weights associated with the edges in a social graph, determining a first probability of existence of an edge in the social graph based on the weights, determining a second probability that a first node forms a triangle with two neighbor nodes and computing a weighted clustering coefficient for the first node based on the first and second probabilities.

Other aspects include corresponding methods, systems, apparatus, and computer program products for these and other innovative aspects.

These and other embodiments may each optionally include one or more of the following features. For instance, the operations include: identifying s sets of neighbors for the first node; selecting a second node and a third node randomly from the s sets of neighbors, and wherein determining the second probability that the first node forms the triangle with the two neighbor nodes comprises determining the second probability that the first node, the second node and the third node form the triangle in the social graph; normalizing the weights based on a nonlinear mapping function, and wherein determining the first probability of existence of the edge in the social graph is based on the normalized weights; comparing the weighted clustering coefficient with a threshold clustering coefficient; determining whether to mark the first node as spam based on the comparison and generating a list of spam nodes for a user; and determining whether to suggest the first node to a user based on the comparison and suggesting the first node to the user responsive to a positive determination. For instance, the features include: selecting the second node and the third node randomly from the s sets of neighbors is implemented s times.

The disclosure may be particularly advantageous in providing an optimized and scalable approach to compute a weighted clustering coefficient and to measure the quality of nodes in a social network. First, the disclosure introduces a new definition for the weighted clustering coefficient that can be computed in polynomial time, and therefore overcomes the computational bottleneck. Second, the disclosure computes the weighted clustering coefficient based on the observation that connections with large weights are more likely to play a role in a social network. If the weight associated with a connection between a first user and a second user increases, e.g., the relationship between the first and second users is updated from acquaintance to good friend, then the probability of determining that the first and second users are high quality users increases.

BRIEF DESCRIPTION OF THE DRAWINGS

The specification is illustrated by way of example, and not by way of limitation in the figures of the accompanying drawings in which like reference numerals are used to refer to similar elements.

DETAILED DESCRIPTION

Figure 1:
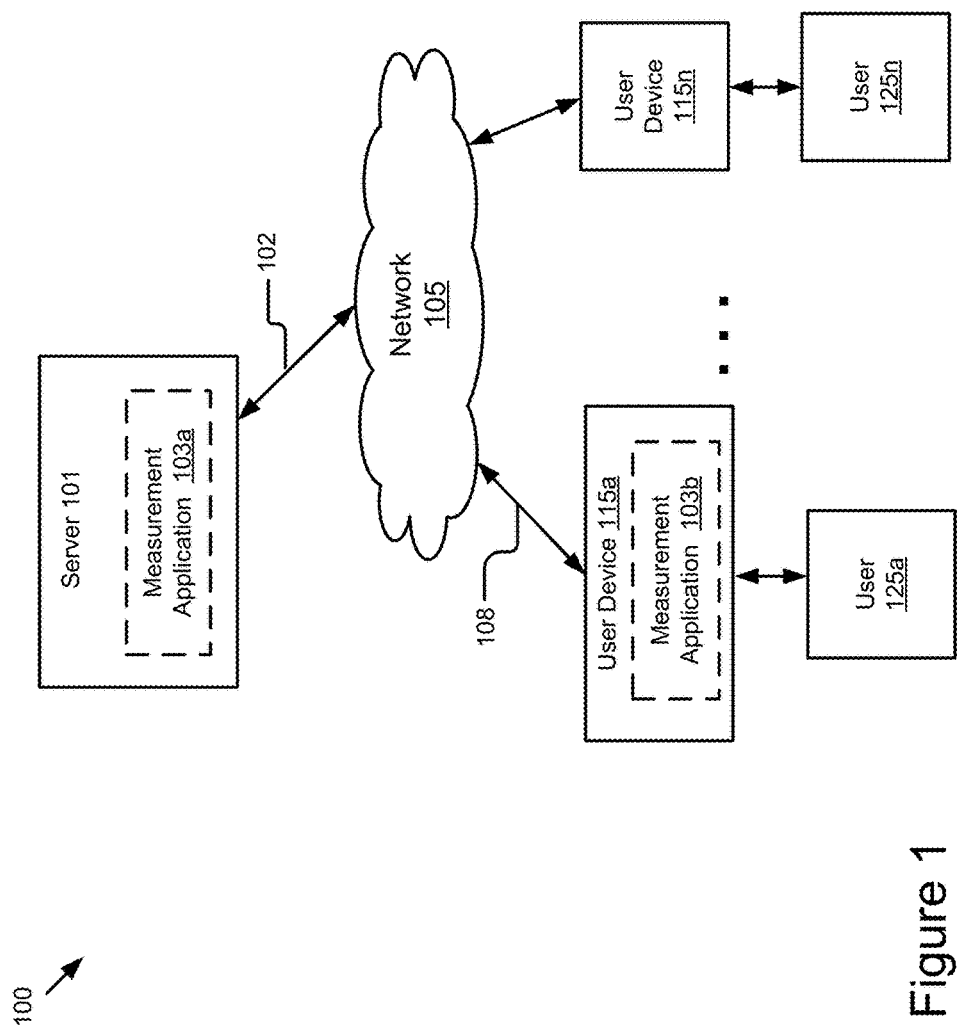
FIG. 1 is a block diagram illustrating an example of a system for generating weighted clustering coefficients for a social network graph.

The specification discloses a system and method for generating weighted clustering coefficients for a social network graph. FIG. 1 illustrates a block diagram of a system 100 for generating weighted clustering coefficients for a social network graph. The illustrated description of the system 100 includes user devices 115a . . . 115n that are accessed by users 125a . . . 125n and a server 101. In the illustrated embodiment, these entities of the system 100 are communicatively coupled via a network 105. In FIG. 1 and the remaining figures, a letter after a reference number, for example "115a" is a reference to the element having that particular reference number. A reference number in the text without a following letter, for example "115," is a general reference to any or all instances of the element bearing that reference number.

The network 105 can be a conventional type network, wired or wireless, and may have any number of configurations for example a star configuration, token ring configuration or other configurations known to those skilled in the art. Furthermore, the network 105 may comprise a local area network (LAN), a wide area network (WAN) (e.g., the Internet), and/or any other interconnected data path across which multiple devices may communicate. In some embodiments, the network 105 may be a peer-to-peer network. The network 105 may also be coupled to or includes portions of a telecommunications network for sending data in a variety of different communication protocols. In other embodiments, the network 105 includes Bluetooth communication networks or a cellular communications network for sending and receiving data for example via SMS/MMS, hypertext transfer protocol (HTTP), direct data connection, WAP, e-mail, etc. While only one network 105 is illustrated, in practice, one or more networks 105 may be coupled to the above-mentioned entities.

The server 101 can be a hardware server that includes a processor, a memory and network communication capabilities. The server 101 is communicatively coupled to the network 105 via signal line 102. The server 101 sends and receives data to and from one or more of the user devices 115a, 115n via the network 105. In some embodiments, the server 101 comprises a measurement application 103a that generates weighted clustering coefficients for a social network graph. While FIG. 1 illustrates one server 101, the system 100 may include one or more servers 101.

The user devices 115a, 115n in FIG. 1 are used by way of example. Although only two user devices 115 are illustrated, the disclosure applies to a system architecture having any number of user devices 115 available to any number of users 125. In the illustrated implementation, the user 125a interacts with the user device 115a. In some embodiments, the measurement application 103b can be stored on the user device 115a which is communicatively coupled to the network 105 via signal line 108. In some embodiments, the measurement application 103 can be split into some components that are stored on the server 101 and some components that are stored on the user device 115a.

In some embodiments, the user device 115 can be any computing device that includes a memory and a processor. For example, the user devices 115 can be a laptop computer, a desktop computer, a tablet computer, a mobile telephone, a personal digital assistant, a mobile email device, a portable game player, a portable music player, a television with one or more processors embedded therein or coupled thereto, or any other electronic device capable of accessing the network 105, etc.

In some embodiments, the user device 115 can include a mobile device that is worn by the user 125. For example, the user device 115 is included as part of a clip (e.g., a wristband), as part of a jewelry or as part of a pair of glasses. In another example, the user device 115 can be a smart watch. The user 125 can view notifications or suggestions from the measurement application 103 on a display of the device worn by the user 125. For example, the user 125 can view the notifications on a display of a smart watch or a smart wristband. In another example, the user 125 can view the notifications on an optical head-mounted display of a pair of glasses.

The measurement application 103 can be software including routines for generating weighted clustering coefficients for a social network graph. In some embodiments, the measurement application 103 can be implemented using hardware including a field-programmable gate array (FPGA) or an application-specific integrated circuit (ASIC). In some other embodiments, the measurement application 103 can be implemented using a combination of hardware and software. In some embodiments, the measurement application 103 may be stored in a combination of the devices and servers, or in one of the devices or servers. The measurement application 103 is described in further detail below with reference to FIG. 2.

The measurement application 103 measures how tightly interconnected a community is around a node in a social network based on the observation that connections with large weights are more likely to play a role in the social network. If a first user connects 100 users in the social network with most of the connections being high-weight relationships (e.g., good friends) and a second user also connects 100 users in the social network with most of the connections being low-weight relationships (e.g., acquaintances), the measurement application 103 may determine that the first user is a higher quality user than the second user based on the weights associated with the first and second users.

The measurement application 103 provides a highly optimized and scalable algorithm for approximating the weighted clustering coefficient at each node of a social graph. The measurement application 103 sends a number of messages across processors limited by the number of nodes times the number of samples required. The load for each processors is limited by the number of samples used by the algorithm times the maximum degree of a node in the social graph. In practice the sampling algorithm performed by the measurement application 103 converges with few hundred samples. However, the computation of other approaches may require super linear time. In some embodiments, the server 101 includes multiple processors. In other embodiments, multiple servers 101 apply the sampling algorithm.

Figure 2:
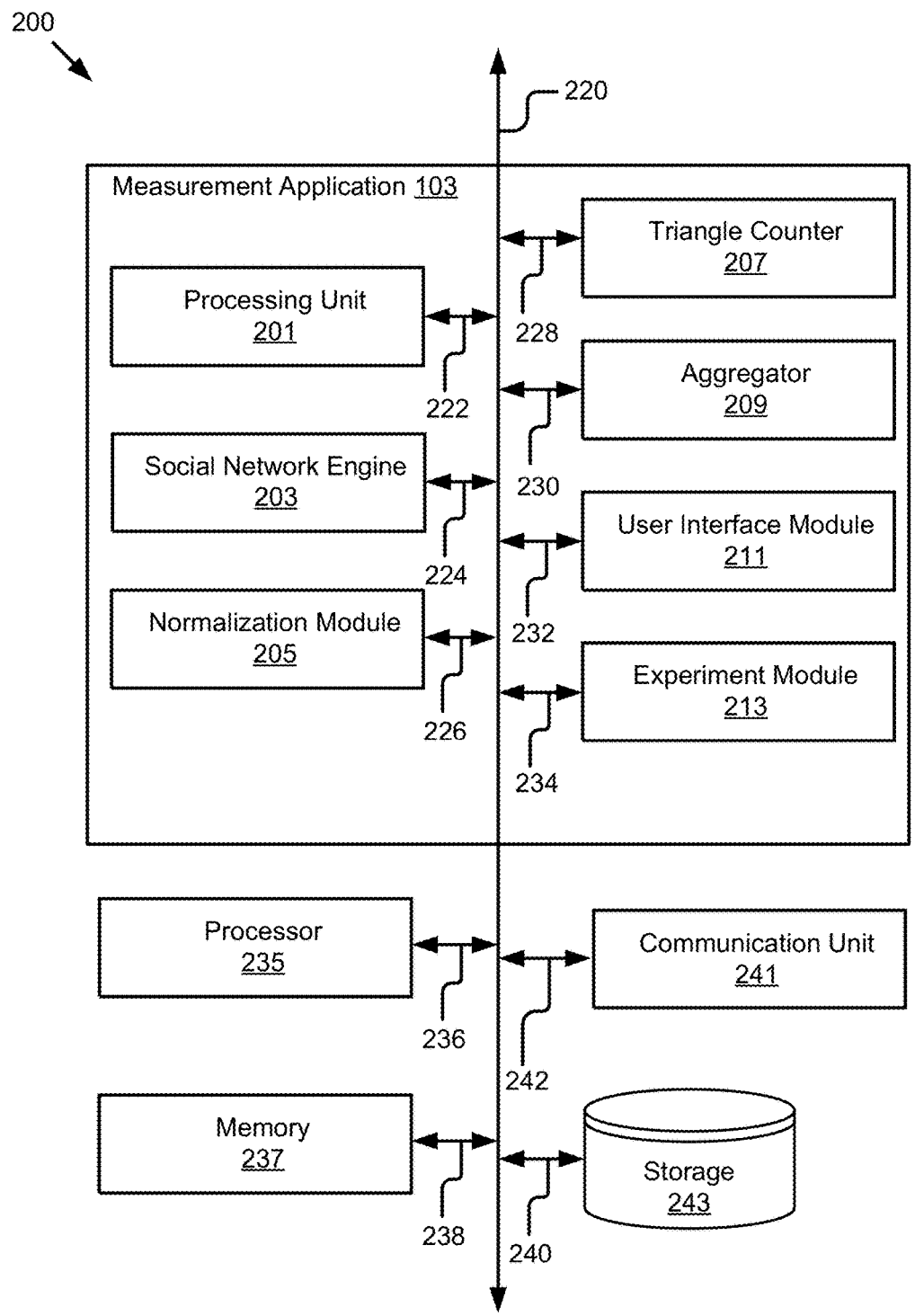
FIG. 2 is a block diagram illustrating an example of a measurement application.

Referring now to FIG. 2, an example of the measurement application 103 is shown in more detail. FIG. 2 is a block diagram of a computing device 200 that includes the measurement application 103, a processor 235, a memory 237, a communication unit 241 and a storage 243 according to some examples. The components of the computing device 200 are communicatively coupled by a bus 220. In some embodiments, the computing device 200 can be one of a user device 115 and a server 101.

The processor 235 includes an arithmetic logic unit, a microprocessor, a general-purpose controller or some other processor array to perform computations and provide electronic display signals to a display device. The processor 235 is coupled to the bus 220 via signal line 236 for communication with the other components. Processor 235 may process data signals and may comprise various computing architectures including a complex instruction set computer (CISC) architecture, a reduced instruction set computer (RISC) architecture, or an architecture implementing a combination of instruction sets. Although only a single processor is shown in FIG. 2, multiple processors 235 may be included. The processing capability may be limited to supporting the display of images and the capture and transmission of images. The processing capability might be enough to perform more complex tasks, including various types of feature extraction and sampling. In practice, other processors, operating systems, sensors, displays and physical configurations are possible.

The memory 237 stores instructions and/or data that may be executed by processor 235. The memory 237 is coupled to the bus 220 via signal line 238 for communication with the other components. The instructions and/or data may include code for performing any and/or all of the techniques described herein. The memory 237 may be a dynamic random access memory (DRAM) device, a static random access memory (SRAM) device, flash memory or some other memory device known in the art. In some embodiments, the memory 237 also includes a non-volatile memory or similar permanent storage device and media for example a hard disk drive, a CD-ROM device, a DVD-ROM device, a DVD-RAM device, a DVD-RW device, a flash memory device, or some other mass storage device known in the art for storing information on a more permanent basis.

The communication unit 241 transmits and receives data to and from at least one of the user device 115 and the server 101 depending upon where the measurement application 103 is stored. The communication unit 241 is coupled to the bus 220 via signal line 242. In some embodiments, the communication unit 241 includes a port for direct physical connection to the network 105 or to another communication channel. For example, the communication unit 241 includes a USB, SD, CAT-5 or similar port for wired communication with the user device 115. In other embodiments, the communication unit 241 includes a wireless transceiver for exchanging data with the user device 115 or any other communication channel using one or more wireless communication methods, such as IEEE 802.11, IEEE 802.16, BLUETOOTH®, or another suitable wireless communication method.

In some embodiments, the communication unit 241 includes a cellular communications transceiver for sending and receiving data over a cellular communications network such as via short messaging service (SMS), multimedia messaging service (MMS), hypertext transfer protocol (HTTP), direct data connection, WAP, e-mail or another suitable type of electronic communication. In other embodiments, the communication unit 241 includes a wired port and a wireless transceiver. The communication unit 241 also provides other conventional connections to the network for distribution of files and/or media objects using standard network protocols such as TCP/IP, HTTP, HTTPS, and SMTP, as will be understood to those skilled in the art.

The storage 243 can be a non-transitory memory that temporarily stores data used by the measurement application 103, for example, a cache. The storage 243 may be a dynamic random access memory (DRAM) device, a static random access memory (SRAM) device, flash memory or some other memory device known in the art. In some embodiments, the storage 243 also includes a non-volatile memory or similar permanent storage device and media such as a hard disk drive, a CD-ROM device, a DVD-ROM device, a DVD-RAM device, a DVD-RW device, a flash memory device, or some other mass storage device known in the art for storing information on a more permanent basis. In the illustrated embodiment, the storage 243 is communicatively coupled by the bus 220 for communication with the other components of the computing device 200 via signal line 240. Although a single storage 243 is shown in FIG. 2, multiple storage devices 243 may be included.

In the illustrated embodiment, the storage 243 stores one or more of social graph data, probabilities, clustering coefficients, information associated with a social network, etc. The data stored in the storage 243 is described below in more detail. In some embodiments, the storage 243 may store other data for providing the functionality described herein.

In the illustrated embodiment shown in FIG. 2, the measurement application 103 includes a processing unit 201, a social network engine 203, a normalization module 205, a triangle counter 207, an aggregator 209, a user interface engine 211, and an experiment module 213.

The processing unit 201 can be software including routines for handling communications between the measurement application 103 and other components of the computing device 200. In some embodiments, the processing unit 201 can be a set of instructions executable by the processor 235 to provide the functionality described below for handling communications. In some embodiments, the processing unit 201 can be stored in the memory 237 of the computing device 200 and can be accessible and executable by the processor 235. The processing unit 201 may be adapted for cooperation and communication with the processor 235 and other components of the computing device 200 via signal line 222.

The processing unit 201 sends and receives data, via the communication unit 241, to and from one or more of a server 101 and a user device 115. For example, the processing unit 201 receives, via the communication unit 241, a request for detecting spam nodes from a user device 115 and sends the request to other components of the measurement application 103 for further processing. In another example, the processing unit 201 receives graphical data for providing a user interface to a user from the user interface module 211 and sends the graphical data to a user device 115, causing the user device 115 to present the user interface to the user.

In some embodiments, the processing unit 201 receives data from components of the measurement application 103 and stores the data in the storage 243. For example, the processing unit 201 receives social graph data including nodes, edges that connect the nodes and weights of the edges from the social network engine 203, and stores the data in the storage 243. In some embodiments, the processing unit 201 retrieves data from the storage 243 and sends the data to components of the measurement application 103. For example, the processing unit 201 retrieves data describing a probability that a node forms a triangle with two neighbor nodes, and sends the data to the aggregator 209.

The social network engine 203 can be software including routines for generating and managing a social network. In some embodiments, the social network engine 203 can be a set of instructions executable by the processor 235 to provide the functionality described below for generating and managing the social network. In other embodiments, the social network engine 203 can be stored in the memory 237 of the server 101 and can be accessible and executable by the processor 235. In some embodiments, the social network engine 203 can be adapted for cooperation and communication with the processor 235 and other components of the server 101 via signal line 224. Persons of ordinary skill in the art will recognize that the social network engine 203 could receive information about social networks that are managed on a separate server.

In some embodiments, the social network engine 203 manages registration of users and creation of a user profile. The user profile associated with a user can include user demographics (e.g., age, location), user interests (e.g., soccer, reading, food), user activities (e.g., search history, indications of approval, posts, comments, multi-player online gaming), work information (e.g., a doctor, an engineer), education (e.g., law, business), etc. The social network engine 203 also manages the association of different actions with the user profile including the publication of posts (e.g., text, links or media) to a selected audience, the publication of comments, indications of acknowledgement (e.g., approval, disapproval, thumbs up, thumbs down, like, dislike. etc.), uploading of media (e.g., photos, videos, etc.), check-ins to different locations, and other actions associated with a social network.

In some embodiments, the social network engine 203 creates a social graph and an interest graph that are stored in the storage 243. The social graph includes the relationship between people in a social network and the interest graph that includes interests associated with the users. For example, when a first user follows a second user, the relationship is a first-degree relationship. If the second user follows a third user that the first user does not follow, the first user has a second-degree relationship with the third user. This relationship can also be described in terms of social affinity. The first user has a closer social affinity to the second user than the third user. The relationship can further be described as single-directional or bi-directional. For example, if user A chooses to follow updates posted by user B, a single-directional relationship is established. If user B also chooses to follow user A, the relationship is bi-directional.

In some embodiments, the social network engine 203 reflects a mapping of users and how they connect in a social network with an undirected graph. The undirected graph comprises social graph data. The social graph data includes nodes, edges and weights. A node represents a user or other entity (e.g., a host, a company) in a social network. An edge represents a connection between two nodes. An edge has no orientation in the undirected graph. A weight associated with an edge measures how close (e.g., the social affinity) is between two nodes. In some embodiments, the social network engine 203 represents the weight with a positive number to exhibit a varying degree of intensity and heterogeneity in the connections between nodes.

In some embodiments, the social network engine 203 determines a weight based on interactions between nodes, e.g., the number of messages exchanged between two users, the number of links between two hosts, etc. For example, the social network engine 203 generates a large weight associated with an edge between two users that frequently interact with each other. In other embodiments, the social network engine 203 determines a weight based on determining whether the relationship between two users is uni-directional or bi-directional. For example, the social network engine 203 determines a smaller weight for an edge representing a uni-directional relationship than for an edge representing a bi-directional relationship.

The social network engine 203 manages the social network by updating the social graph. In some embodiments, the social network engine 203 updates the weights associated with edges. For example, if a first user removes a second user from a group or stops being friends with the second user, the social network engine 203 reduces the weight of the edge connecting the first and second users (or removed the edge if the relationship was uni-directional) to reflect the relationship change.

In some embodiments, the social network engine 203 transmits the data (e.g., social graph data, user activity data, user profiles, etc.) to the normalization module 205 and the triangle counter 207 for processing and organizing with other data sources. In other embodiments, the social network engine 203 also stores the data on the storage 243.

The normalization module 205 can be software including routines for normalizing a weight associated with an edge and determining a first probability of existence of the edge in the social graph based on the normalized weight. In some embodiments, the normalization module 205 can be a set of instructions executable by the processor 235 to provide the functionality described below for normalizing a weight associated with an edge and determining a first probability of existence of the edge in the social graph based on the normalized weight. In some embodiments, the normalization module 205 can be stored in the memory 237 of the computing device 200 and can be accessible and executable by the processor 235. The normalization module 205 may be adapted for cooperation and communication with the processor 235 and other components of the computing device 200 via signal line 226.

The aggregator 209 generates clustering coefficients to quantify how tightly interconnected a community is around a node where the community could be nodes or a group of nodes. The aggregator 209 focuses on two aspects when generating clustering coefficients. One focus is that the measurement application 103 computes weighted clustering coefficients. Since weights on edges are used to measure the number of messages exchanged between friends or the number of links between hosts in a social network, the statistical level of cohesiveness in the social network that is measured from a clustering coefficient should in principle also depend on the weights of the edges. In some embodiments, the normalization module 205 determines a first probability of existence of an edge in the social graph based on normalizing the weight associated with the edge. Another focus of the technology is to overcome computational bottleneck. The problem of computing the weighted clustering coefficient is closely related to the problem of counting the number of triangles in a social graph. This is computationally expensive even on social graphs of moderate size because of the time complexity needed to enumerate all the length-two paths of the social graph. The triangle counter 207 provides a highly optimized and scalable implementation for counting the number of triangles in the social graph. In some embodiments, the triangle counter 207 determines a second probability that a first node forms a triangle with two neighbor nodes.

Based on the observation that edges with large weights are more likely to play a role in a social network, the normalization module 205 determines a first probability of an edge depending on the weight of the edge received from the social network engine 203. In some embodiments, the weight associated with an edge is a positive number that may be outside the range [0, 1]. The normalization module 205 determines a mapping function, normalizes the weight of an edge to the range [0, 1] using the mapping function and determines a first probability of existence of the edge based on the normalized weight.

In some embodiments, the normalization module 205 first determines whether to select a linear mapping function or a non-linear mapping function. The normalization module 205 receives social graph data including weights w(e) associated with edges e in the social graph from the social network engine 203, and identifies the maximum weight W (also denoted as "$e_W$") and the minimum weight w (also denoted as "$e_w$") from w(e). In the following description, the variables W and w will be interchangeable with the variables $e_W$ and $e_w$, respectively. If the mapping function is linear, the normalization module 205 would linearly map $[e_w, e_W]$ to [0, 1]. However, this mapping may have serious drawbacks. For example, since the weights associated with the edges in social networks are distributed as a power law, the proportion $e_w/e_W$ can be very small. In a social network with 114,529 hosts, the normalization module 205 determines that the proportion $e_w/e_W$ is 1/2579857. As a result, normalizing the weights using the linear mapping would lead the first probability determined based on the normalized weight to be very small, which in turn would result in an extremely small second probability for each triangle determined by the triangle counter 207 in the social graph.

The normalization module 205 determines to select which non-linear function to normalize the weights. In some embodiments, the normalization module 205 uses a logarithmic dependence between probability and weight to allow better control of the scale of variation of the parameters (e.g., $e_w$, $e_W$). For example, a classical example of logarithmic function is $$\frac{1}{1 + \log W/w(e)},$$

where W=max w(e) is the maximum weight. Other non-linear mapping functions can be used, which will be described in detail with reference to the experiment module 213.

In some embodiments, the normalization module 205 interprets the normalized weights as first probabilities of the existence of the edges. For example, the normalization module 205 determines that an edge e appears independently with a first probability p(e), where $$p(e) = \frac{1}{1 + \log W/w(e)}.$$

The normalization module 205 determines a higher first probability of the existence of an edge as the weight associated with the edge is larger. The normalization module 205 determines that the first probability equals one for the edge with the maximum weight and determines that the first probability equals zero for the edge with the minimum weight. In some embodiments, the normalization module 205 determines the first probability of existence associated with a set of edges (e.g., two or more edges) based on the weights. Suppose that a graph G'=(V,E')∈$g_{n,p}$ is an edge subset E' of E, where $g_{n,p}$ is the class of a random graph with edge e appearing independently with the first probability p(e), V denotes all nodes on the social graph and E denotes an entire set of edges connecting V. The normalization module 205 determines that the first probability of G' is $p(G')=\pi_{e \in E'}p(e)\pi_{e \notin E'}(1-p(e))$.

In some embodiments, the normalization module 205 stores the first probability associated with an edge on the storage 243. In other embodiments, the normalization module 205 sends the first probability to the aggregator 209.

The triangle counter 207 can be software including routines for determining a second probability that a first node forms a triangle with two neighbor nodes. In some embodiments, the triangle counter 207 can be a set of instructions executable by the processor 235 to provide the functionality described below for determining a second probability that a first node forms a triangle with two neighbor nodes. In some embodiments, the triangle counter 207 can be stored in the memory 237 of the computing device 200 and can be accessible and executable by the processor 235. The triangle counter 207 may be adapted for cooperation and communication with the processor 235 and other components of the computing device 200 via signal line 228.

A clustering coefficient quantifies how tightly interconnected a community is around a node where the community includes other nodes or a group of nodes. The clustering coefficient is based on triplets of the node. A triplet includes three nodes that are connected by either two edges (e.g., open triplet) or three edges (e.g., closed triplet). A closed triplet is a triangle. The triangle counter 207 counts the number of triangles associated with a first node and determines a second probability that the first node forms a triangle with two randomly selected neighbor nodes. A traditional unweighted clustering coefficient may be based only on this number. However, a weighted clustering coefficient is not only based on this number or the second probability but also based on the first probability determined by the normalization module 205.

For example, in an undirected graph, a first node has three neighbor nodes. Each node represents a user in a social network. If the first node and the three neighbor nodes connect with each other, the triangle counter 207 determines that the four nodes form six triangles, i.e., the maximum number of triangles that four nodes can possibly form. The maximum number of triangles means that the four users associated with the four nodes may be tightly connected classmates who work on different sub-projects of a same project.

If the first node connects with each of the three neighbor nodes and none of the three neighbor nodes connects with each other, the triangle counter 207 counts three edges in total. Since each of the three edges has the first node in common, the triangle counter 207 determines that the four nodes form zero triangle. This means that the unweighted/weighted clustering coefficient is zero. In this case, the first user associated with the first node may be considered as a spammer. For example, the first user sends spam emails to the three neighbors and thus forms the three edges. Since a spammer usually sends emails to random users that do not know each other, the clustering coefficient is indicative of the fact that none of the three neighbors of the first user (e.g., the spammer) connect with each other.

If the first node connects with each of the three neighbor nodes, the triangle counter 207 counts three edges. If a second node of the three neighbor nodes also connects with a third node of the three neighbor nodes, the triangle counter 207 counts a fourth edge between the second and third nodes. The triangle counter 207 then determines that one triangle forms between the first, second and third nodes. Consequently a clustering coefficient between the minimum (e.g., zero) and the maximum (e.g., one) can be determined. In this case, the first user may be an ordinary person who interacts with some friends regularly.

There are various approaches that investigate the close relationship between counting the number of triangles and computing a clustering coefficient. Let G=(V,E) be an undirected graph. For every node v∈V, let N(v,G) denote its neighborhood, e.g., N(v,G)={u∈V:∃(u,v)∈E}. Typically the unweighted clustering coefficient of a node v is defined as the probability that a random pair of neighbors of the node v is connected by an edge, e.g., $$C_v(G) := \frac{|\{(u, w) \in E : u, w \in N(v, G)\}|}{\binom{|N(v, G)|}{2}},$$

In some embodiments, the weighted clustering coefficient can be defined as the expected clustering coefficient on a family of random graphs, e.g., $$WC_v = E_{G' \in g_{n,p}} C_v(G') = \qquad \text{(Equation 1)}$$

$$E_{G' \in g_{n,p}} \left[ \sum_{u,w \in N'(v) \wedge (u,w) \in E'} p_r(\chi(u, w) = 1 \mid G') \right],$$

In the new definition of the weighted coefficient in Equation 1, $WC_v$ is the weighted coefficient for a node v, u,w are neighbor nodes that may form a triangle with v, N'(v) is a set of neighboring nodes of v, the graph $G'=(V,E') \in g_{n,p}$ is an edge subset E' of E, and $\chi(u,w)$ is a random variable that has value 1 if the randomly selected pair is (u,w) and 0 otherwise.

By defining that a random value (u,v)=1 that has value 1 if and only if u,w∈N'(v)^(u,w)∈E and by denoting with $1_{\xi(u,v)=1}$ its indicator function, the weighted coefficient can be computed as following:

$$WC_v =$$

$$E_{G' \in g_{n,p}} \left[ \sum_{u,w \in N'(v) \wedge (u,w) \in E'} Pr(\chi(u, w) = 1 \mid G') \right]$$

$$E_{G' \in g_{n,p}} \left[ \sum_{u,w \in N(v)} 1_{\xi(u,v)} Pr(\chi(u, w) = 1 \mid G') \right]$$

$$\sum_{u,w \in N(v)} E_{G' \in g_{n,p}} [1_{\xi(u,v)} Pr(\chi(u, w) = 1 \mid G')]$$

$$\sum_{u,w \in N(v)} \left( Pr(\xi(u, v) = 1) * E_{G' \in g_{n,p}} [1_{\xi(u,v)} Pr(\chi(u, w) = 1 \mid G') \mid \xi(u, v) = 1] \right)$$

Therefore, we have:

$$WC_v = \sum_{u,w \in N(v)} (p_r(u, w \in N'(v) \wedge (u, w) \in E) * \qquad \text{(Equation 2)}$$

$$p_r(\chi(u, w) = 1 \mid \xi(u, v) = 1))$$

On the one side, since the normalization module 205 determines that the first probabilities of existence of edges $e_{u,v}$ (e.g., the edge between the nodes u and v), $e_{w,v}$ and $e_{w,u}$ are $p(e_{u,v})$, $p(e_{w,v})$ and $p(e_{w,u})$, respectively, the first term of Equation 2 can be computed as follows:

$$p_r(u,w \in N'(v)^\wedge (u,w) \in E) = p(e_{u,v})p(e_{w,v})p(e_{w,u}) \qquad \text{(Equation 3)}$$

On the other side, the second term $p_r(\chi(u,w)=1|\xi(u,v)=1)$ in Equation 2 depends on the possible instantiations of G' and therefore may involve the computation of exponentially many terms in large social networks. Note that $$p_r(\chi(u,w)=1|\xi(u,v)=1) = p_r(\chi(u,w)=1|u,w \in N'(v))$$

is the probability that a pair u,w of neighbors of v are selected conditioned on u,w∈N'(v). Since the probability that the nodes u,w,v form a triangle equals to the probability that the randomly selected pair u,w are connected with an edge, the triangle counter 207 can determine a second probability that a first node forms a triangle with two neighbor nodes based on the probability of selecting a specific pair u,w from neighbors of v.

In some embodiments, the triangle counter 207 uses a dynamic program to determine the second probability as probability $p_r(\chi(u,w)=1|u,w \in N'(v))$. To compute this probability, the triangle counter 207 uses the equivalence between two processes. The first process is to select two elements uniformly at random without replacement from a set S. The second process is to compute a random permutation of the elements in the set S and then returns the first two elements of the permutation. Based on this equivalence, the triangular counter 207 rephrases the probability $p_r(\chi(u,w)=1|u,w \in N'(v))$ as the probability that in a random permutation of the nodes in N(v),u,w are the two nodes with the smallest positions in N'(v), e.g., either u and w are the first two nodes in the permutation of the nodes in N(v) or all the nodes that are in positions smaller than u and w do not appear in N'(v). For example, if the set S includes three neighbors {u,w,z} of v, the probability of selecting two elements u,w from the set S in the first process is ⅓ because there are three selections (u,w), (u,z) or (z,w) in total. In the second process, all the random permutations of u,w,z are {u,w,z}, {w,u,z}, {u,z,w}, {z,u,w}, {z,w,u} and {w,z,u}. Since only the first two permutations out of the six total permutations satisfy the condition that u,w are the two nodes with the smallest positions, the probability computed in the second process is also ⅓. As a result, the triangle counter 207 determines the probability in the first process, e.g., the probability of selecting a specific pair u,w from neighbors of v, $p_r(\chi(u,w)=1|u,w \in N'(v))$, by determining the probability in the second process.

In some embodiments, the triangle counter 207 first computes the probability for all the permutations containing the nodes $\{u,w,z_1,z_2, \ldots z_{i-1}\}$ and then extends the computation to the permutations also containing the node $z_i$. There are two scenarios. In the first scenario, the node $z_i$ appears after u and w in the permutation. In this case, the probability that u and w are the nodes in N'(v) with the two smallest positions will not change, e.g., the triangle counter 207 computes the same probability for all the permutations containing the nodes $\{u,w,z_1,z_2, \ldots z_{i-1}\}$ and for all the permutations containing the nodes $\{u,w,z_1,z_2, \ldots z_{i-1},z_i\}$. In the second scenario, the node $z_i$ appears before either u or w. In this case, the probability that u and w are the nodes in N'(v) with the two smallest positions will decreases by a multiplicative factor $1-p(e_{v,z_i})$. By analyzing the permutations containing only {u,w}, then the ones containing {u,w, $z_1$}, then the ones containing {u,w,$z_1$,$z_2$} and so on, the triangle counter 207 determines the probability for each permutation containing all the elements in neighbor sets of v. The triangle counter 207 determines a second probability that a first node forms a triangle with two neighbor nodes based on the analysis of the each permutation. The triangle counter 207 then sends the second probability to the aggregator 209 to determine an exact weighted clustering coefficient in polynomial time. However, the computational complexity of this exact computation is expensive or even prohibitive for a social network that has a moderate size or a large size.

In other embodiments, the triangle counter 207 uses an efficient sampling algorithm to estimate the second probability that a first node forms a triangle with two neighbor nodes. This sampling algorithm provides an approximation of the number of triangles with probability $(1-\delta)$. As a result, the aggregator 209 can approximate with high probability up to a $(1\pm\in)$ factor the weighted clustering coefficient of the node. In some embodiments, the sampling algorithm is based on the uniform sampling of a random neighbor pair adjacent to a node in a random realization of a graph of the family. The number of samples needed is limited both theoretically and in practical experiments. In some embodiments, the triangle counter 207 identifies s sets of neighbors for a first node. The triangle counter 207 selects a second node and a third node randomly from the s sets of neighbors, and determines a second probability that the first node, the second node and the third node form a triangle in the social graph. The triangle counter 207 determines whether the random pair has been selected s times. If yes, a weighted clustering coefficient is computed. For example, the triangle counter 207 selects a pair of nodes (u,w) from the neighbors of node v. The triangle counter 207 determines the probability that (u,w,v) form a triangle in the first neighbor set $N_1(v)$, the probability that (u,w,v) form a triangle in the second neighbor set $N_2(v)$, the probability that (u,w,v) form a triangle in the third neighbor set $N_3(v)$ and so on. Once the triangle counter 207 determines the probability that (u,w,v) form a triangle in the s-th neighbor set $N_s(v)$, the triangle counter 207 sends the probability to the aggregator 209 to compute an approximate of the weighted clustering coefficient. The sampling algorithm will be described in detail with reference to the aggregator 209 and the experiment module 213.

The aggregator 209 can be software including routines for computing the weighted clustering coefficient for the first node based on the first and second probabilities. In some embodiments, the aggregator 209 can be a set of instructions executable by the processor 235 to provide the functionality described below for computing the weighted clustering coefficient for the first node based on the first and second probabilities. In some embodiments, the aggregator 209 can be stored in the memory 237 of the computing device 200 and can be accessible and executable by the processor 235. The aggregator 209 may be adapted for cooperation and communication with the processor 235 and other components of the computing device 200 via signal line 230.

The aggregator 209 receives data including the first probability and the second probability from the normalization module 205 and the triangle counter 207 respectively, and computes the clustering coefficient based on the data. In some embodiments, the triangle counter 207 uses a dynamic programming algorithm to compute the second probabilities. In other embodiments, the triangle counter 207 uses a sampling algorithm to compute the second probabilities. The aggregator 209 computes the weighted clustering coefficient correspondingly.

Using the dynamic programming algorithm, the aggregator 209 first determines a square matrix M of dimension $|N(v)|-1$ from the received data. In position $M_{i,j}$, for $j\leq i$, the matrix M contains the probability that u and w are the nodes in $N'(v)$ with the two smallest positions in a random permutation containing nodes $\{u,w,z_1,z_2,\ldots z_{i-1},z_i\}$ and with j elements in positions smaller either of u or w. The aggregator 209 determines that $M_{0,0}$ is equal to 1 because in this case the permutations contains only $\{u,w\}$. Similarly, the aggregator 209 can compute $M_{1,0}$ and $M_{1,1}$. In particular, $M_{1,0}$ requires that $z_1$ is in a position after u and w. The aggregator 209 computes that $$M_{1,0} = \frac{1}{3}M_{0,0}.$$

The aggregator 209 also determines that $$M_{1,1} = \frac{2}{3}(1 - p(e_{v,z_1}))M_{0,0}.$$

More generally, the aggregator 209 computes the matrix M for $j\leq i$ as follows:

$$M_{i,j} = \begin{cases} \frac{i-1}{i+1}M_{i-1,0} & \text{if } j = 0 \\ \frac{i-j-1}{i+1}M_{i-1,j} + \frac{j+1}{i+1}\overline{p}(e_{v,z_i})M_{i-1,j-1} & \text{if } j < i, j > 0 \\ \frac{i}{i+1}\overline{p}(e_{v,z_i})M_{i-1,j-1} & \text{if } j = i \end{cases}$$

The aggregator 209 determines that the probability that a pair u,w of neighbors of v are selected conditioned on $u,w \in N'(v)$, e.g., $p_r(\chi(u,w)=1|u,w\in N'(v))$, is:

$$p_r(\chi(u,w)=1|u,w\in N'(v))=\Sigma_{i=0}^{|N'(v)|-2}M_{|N'(v)|-2,i}.$$

Based on Equation 2 and Equation 3 described above, the aggregator 209 then computes the weighted clustering coefficient $WC_v$ as follows:

$$WC_v = \sum_{u,w\in N(v)} \left(\frac{1}{2}p(e_{u,v})p(e_{w,v})p(e_{u,w}) * \left(\sum_{i=0}^{|N'(v)|-2} M_{|N'(v)|-2,i}\right)\right)$$

In summary, the aggregator 209 computes the weighted clustering coefficient $WC_v$ using the dynamic programming algorithm as follows:
Algorithm (dynamic programming, exact $WC_v$)
Input: The weighted subgraph induced by $v\cup N(v)$,
Output: $WC_v$.
$WC_v=0$.
for all $u,w\in N(v)$ do
    Compute the matrix M for u,w
    Using M, compute the probability p that (u,v,w) is a triangle and is selected
    $WC_v\mathrel{+}=p$.
Output $WC_v$.
However, the above-described dynamic programming algorithm could be too slow for a large size social network.

Based on the sampling algorithm, the aggregator 209 can compute the weighted clustering coefficient in a short time. The sampling algorithm is based on sampling a random pair (u,w) from a random graph $G'\in g_{n,p}$ and checking whether $(u,w)\in G'$. The aggregator 209 computes the weighted clustering coefficient $WC_v$ using the sampling algorithm as follows:
Algorithm (sampling, approximate $WC_v$)
Input: The weighted subgraph induced by $v\cup N(v)$,
Output: Approximate $WC_v$.

Sample s neighbor realization $N(v)_1, \ldots N(v)_s$ uniformly at random from $g_{n,p}$
for all i=1 to s do
    Sample a random wedge <u,w> uniformly from $N(v)_i$
    If $(u,w) \in E_i$ then set $X_i \leftarrow 1$
    else set $X_i \leftarrow 0$
Output $$X := \frac{1}{s}\sum_{i=1}^{s} X_i.$$

For each $i \in \{1, \ldots, s\}$, the expectation $E[X] = WC_v$ and the Var $$[X] \leq \frac{WC_v}{s},$$

applying the Chebyshev inequality gives:

$$Pr[|X - E[X]| \geq \epsilon \cdot E[X]] \leq \frac{VAR[X]}{(\epsilon \cdot E[X])^2} = \frac{1}{s \cdot \epsilon \cdot WC_v}$$

Based on this inequality, the aggregator 209 approximates the weighted clustering coefficient within a relative error of $(1 \pm \epsilon)$ with a high probability if $$s \geq \frac{3}{\epsilon^2 \cdot WC_v}.$$

In some embodiments, the aggregator 209 amplifies the probability of success by running the sampling algorithm multiple times and returning the median of all results. The implementation of the sampling algorithm will be described in detail with reference to the experiment module 213.

The aggregator 209 uses the weighted clustering coefficient in applications relevant to a social network, for example, detecting a spam node in the social network or suggesting a user in the social network. In some embodiments, the aggregator 209 computes a weighted clustering coefficient for a node in a social network, compares the weighted clustering coefficient with a threshold clustering coefficient and determines whether to mark the node as spam based on the comparison. For example, in a social network having 114, 529 hosts, 5709 hosts are marked as "non-spam" and 344 hosts are marked as "spam" manually by a group of volunteers. The aggregator 209 computes the weighted clustering coefficients for the nodes in the social network, and determines to mark 2058 hosts as "non-spam" and to mark 93 hosts as "spam" based on a threshold clustering coefficient of zero. If the weighted clustering coefficient exceeds zero, the 93 hosts are not spam. In this way, the aggregator 209 refines the detection of spam nodes. In some embodiments, the aggregator 209 generates a list of spam nodes for a user and communicates with the user interface engine to provide the list to the user.

In other embodiments, the aggregator 209 computes the weighted clustering coefficient for a node in a social network, compares the weighted clustering coefficient with a threshold clustering coefficient, determines whether to suggest the node to a user based on the comparison and suggests the node to the user responsive to a positive determination. For example, the aggregator 209 determines that the weighted clustering coefficient associated with a first node in a social network exceeds a threshold clustering coefficient, which indicates that a tight community is formed around a first user represented by the first node. The first user may be a team leader that is in charge of an important project in a company. If two neighbors of the first node (e.g., team members) have not yet connected in the social network, the aggregator 209 suggests that they connect with each other. If a second user is not a neighbor of the first user (e.g., a co-worker that is not in the team), the aggregator 209 suggests that the second user connect with the first user so that the second user can know more about the important project in the company. Those skilled in the art will recognize that the weighted clustering coefficient can be used in other applications.

The user interface engine 211 can be software including routines for generating graphical data for providing user interfaces to users. In some embodiments, the user interface engine 211 can be a set of instructions executable by the processor 235 to provide the functionality described below for generating graphical data for providing user interfaces to users. In some embodiments, the user interface engine 211 can be stored in the memory 237 of the computing device 200 and can be accessible and executable by the processor 235. The user interface engine 211 may be adapted for cooperation and communication with the processor 235 and other components of the computing device 200 via signal line 232.

In some embodiments, the user interface engine 211 generates graphical data for providing a user interface that includes a list of spam nodes. The user interface engine 211 sends the graphical data to a user device 115, causing the user device 115 to present the user interface to the user. In other embodiments, the user interface engine 211 generates graphical data for providing a user interface that includes a suggestion for a user. The user may accept or reject the suggestion based on a user action performed on the user interface. An example user interface is shown in FIG. 6B. The user interface engine 211 may generate graphical data for providing other user interfaces to users.

The experiment module 213 can be software including routines for conducting an experiment to simulate a performance of an algorithm. In some embodiments, the experiment module 213 can be a set of instructions executable by the processor 235 to provide the functionality described below for conducting an experiment to simulate a performance of an algorithm. In some embodiments, the experiment module 213 can be stored in the memory 237 of the computing device 200 and can be accessible and executable by the processor 235. The experiment module 213 may be adapted for cooperation and communication with the processor 235 and other components of the computing device 200 via signal line 234.

In some embodiments, the experiment module 213 communicates with the aggregator 209 to use a highly optimized and scalable framework to implement the sampling algorithm for computing the weighted clustering coefficient. For example, the experiment module 213 uses a programming model for processing large data sets with a parallel, distributed algorithm on a cluster, such as MapReduce. The MapReduce framework is designed to simplify the implementation of parallel algorithms at very large scale. In the MapReduce framework, the data is processed in tuples composed by <key, value>. The computation proceeds in rounds. In some cases, the computation includes at least three phrases: the Map phase, the Shuffle phase and the Reduce phase. In the Map phase, each machine receives all the values associated with a specific key k, executes certain computation and outputs <key, value> tuples with potentially different key k'. In the Shuffle phase, each machine aggregates all tuples with the same key k' that is sent to the same physical machine. Finally, in the Reduce phase, each machine performs a computation that only depends from the tuples with the same key k' received from the Mapper, and outputs <key, value> tuples with the key equal to the input k'.

The experiment module 213 implements the sampling algorithm with MapReduce to approximate the weighted clustering coefficient. This implementation achieves the important design requirements of the MapReduce algorithm in that it i) minimizes the number of MapReduce rounds that are involved, ii) minimizes the amount of communication between machines and iii) balances the working load across different machines.

The experiment module 213 stores the social graph in <key; value> tuples that represents the adjacency list of each node. In the first Map phase, each machine reads the adjacency list of node u. For sample i=1, . . . s, the machine constructs a realization of the neighborhood of node u, $N_i(u)$ according to $g_{n,p}$ and samples a pair of random neighbors $(v_i, w_i) \in N_i(u)$. The experiment module 213 sends a message with key $w_i$ and value i, $(u, v_i)$ to the machine that controls the node $w_i$. The informal meaning of these messages is that node u asks node $w_i$ whether edge $(w_i, v_i)$ exists in the i-th realization so that the experiment module 213 can infer that a triangle $u, w_i, v_i$ exists in realization i. Finally, node u also sends its adjacency list to itself in order to answer requests from other nodes. Usually a naive implementation of the sampling procedure would have running time quadratic in the size of the adjacency list. However, the experiment module 213 uses the MapReduce program to select a random pair of neighbors in linear time, in particular, to assign to each neighbor a random number and to select the two neighbors with the smallest assigned values.

In the first Reduce phase, node u receives its own adjacency list and various requests i, $(w, v_i)$ to check the existence of edge $(u, v_i)$ in realization $N_i(u)$. If the test is positive, the experiment module 213 writes a value <u,w> with its own key to indicate that there should be a triangle with node w in one of the samples.

In the second Map phase, each node v reads the values written in the previous Reduce phase. For each detected triangle <v,u>, node v sends a message <u,1> to the node u to certify the existence of the triangle. Finally, in the last Reduce step the experiment module 213 receives the number of sampled triangles for each node and computes the clustering coefficient for each node by dividing the number of sampled triangles by the number of samples. In some embodiments, the experiment module 213 also extends the MapReduce algorithm to compute the unweighted clustering coefficient.

The experiment module 213 uses two rounds of MapReduce in the implementation presented above. The experiment module 213 sends a number of messages across machines upper bounded by the number of nodes times the number of samples required. The load for each machine is upper bounded by the number of samples used by the algorithm times the maximum degree of a node in the social graph. The experimental results indicating how fast this implementation is in practice will be described in detail with reference to FIGS. 7A-7G.

Figure 3:
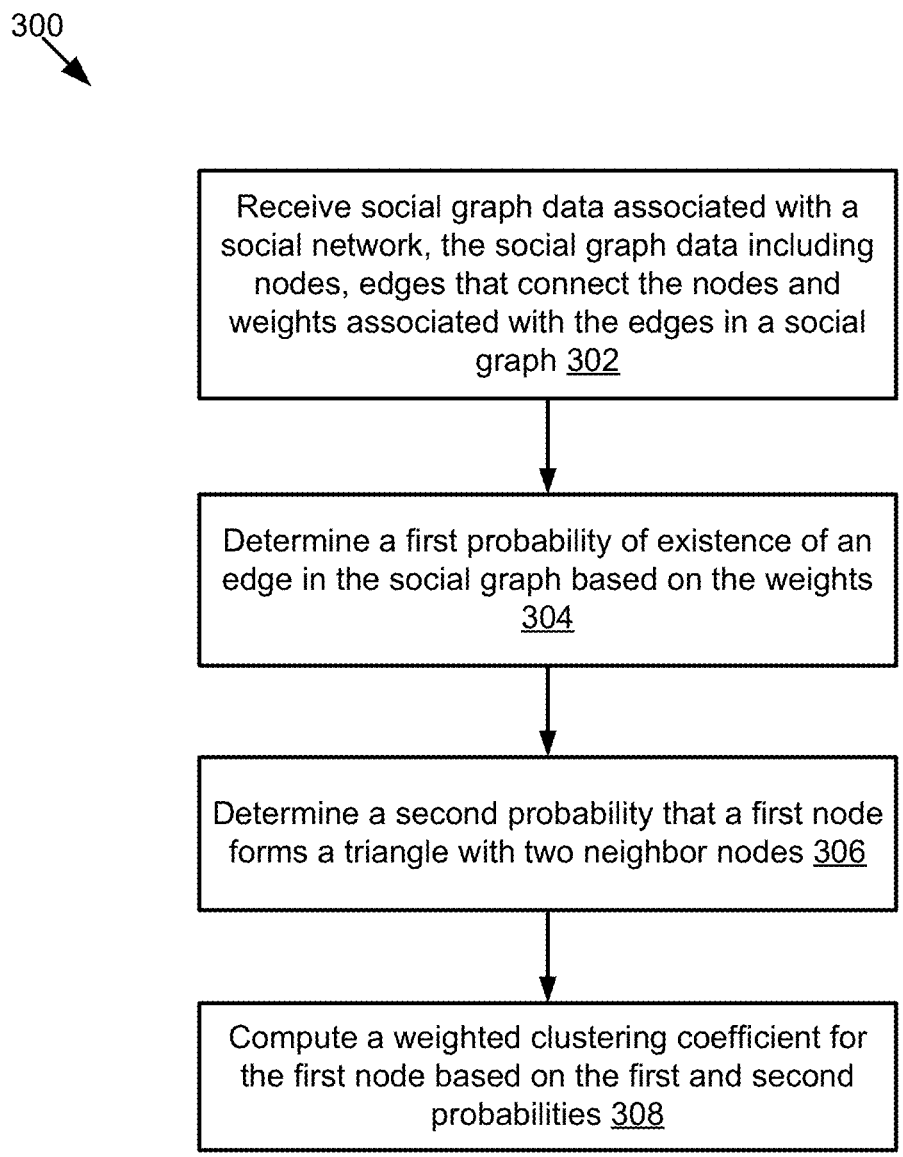
FIG. 3 is a flow diagram of an example method for generating weighted clustering coefficients for a social network graph.

FIG. 3 is a flow diagram of an example of a method 300 for generating weighted clustering coefficients for a social network graph. The measurement application 103 comprises a processing unit 201, a normalization module 205, a triangle counter 207 and an aggregator 209. The processing unit receives 302 social graph data associated with a social network, the social graph data including nodes, edges that connect the nodes and weights associated with the edges in a social graph. The normalization module 205 determines 304 a first probability of existence of an edge in the social graph based on the weights. The triangle counter 207 determines 306 a second probability that a first node forms a triangle with two neighbor nodes. The aggregator 209 computes 308 a weighted clustering coefficient for the first node based on the first and second probabilities.

Figure 4:
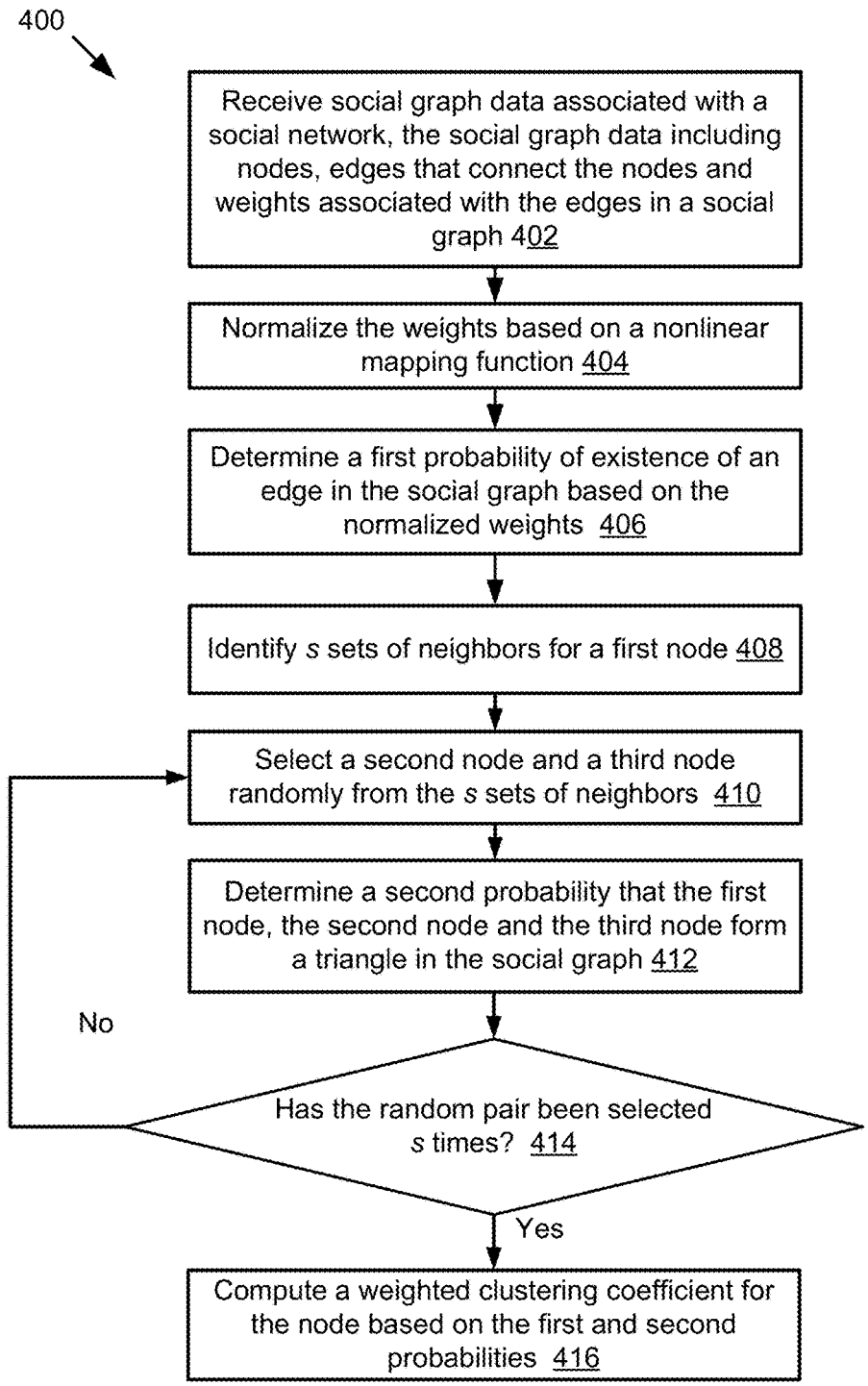
FIG. 4 is a flow diagram of another example method for generating weighted clustering coefficients for a social network graph.

FIG. 4 is a flow diagram of another example of a method 400 for generating weighted clustering coefficients for a social network graph. The measurement application 103 comprises a processing unit 201, a social network engine 203, a normalization module 205, a triangle counter 207 and an aggregator 209.

The processing unit receives 402 social graph data associated with a social network, the social graph data including nodes, edges that connect the nodes and weights associated with the edges in a social graph. A weight associated with an edge measures how close the connection is between two nodes. In some embodiments, the social network engine 203 represents the weight with a positive number to exhibit a varying degree of intensity and heterogeneity in the connections between nodes. In some embodiments, the social network engine 203 determines a weight based on interactions between nodes, e.g., the number of messages exchanged between two users, the number of links between two hosts, etc. In other embodiments, the social network engine 203 determines a weight based on determining whether the relationship between two users is uni-directional or bi-directional.

The normalization module 205 normalizes 404 the weights based on a nonlinear mapping function. The normalization module 205 determines 406 a first probability of existence of an edge in the social graph based on the normalized weights. In some embodiments, the normalization module 205 interprets the normalized weights as first probabilities of existence of the edges. For example, the normalization module 205 determines that an edge e appears independently with a first probability p(e), where $$p(e) = \frac{1}{1 + \log W / w(e)}.$$

In some embodiments, the normalization module 205 determines the first probability of existence associated with a set of edges (e.g., two or more edges) based on the weights. For example, the normalization module 205 determines that the first probability of G' is $p(G') = \pi_{e \in E'} p(e) \pi_{e \notin E'} (1 - p(e))$, where $G' = (V, E') \in g_{n,p}$ is an edge subset E' of E.

The triangle counter 207 identifies 408 s sets of neighbors for a first node. The triangle counter 207 selects 410 a second node and a third node randomly from the s sets of neighbors. The triangle counter 207 determines 412 a second probability that the first node, the second node and the third node form a triangle in the social graph. The triangle counter 207 determines 414 whether the random pair has been selected s times. If yes, the method 400 goes to step 416. Otherwise, the method goes to step 410. For example, the triangle counter 207 selects a pair of nodes (u,w) from the neighbors of node v. The triangle counter 207 determines the probability that (u,w,v) form a triangle in the first neighbor set $N_1(v)$, the probability that (u,w,v) form a triangle in the second neighbor set $N_2(v)$, the probability that (u,w,v) form a triangle in the third neighbor set $N_3(v)$ and so on. Once the triangle counter 207 determines the probability that (u,w,v) form a triangle in the s-th neighbor set $N_s(v)$, the triangle counter 207 sends the probability to the aggregator 209 to compute an approximate of the weighted clustering coefficient.

The aggregator 209 computes 416 a weighted clustering coefficient for the first node based on the first and second probabilities. The aggregator 209 approximates the weighted clustering coefficient within a relative error of (1±∈) with a high probability. In some embodiments, the aggregator 209 amplifies the probability of success by running the sampling algorithm multiple times and returning the median of all results.

Figure 5:
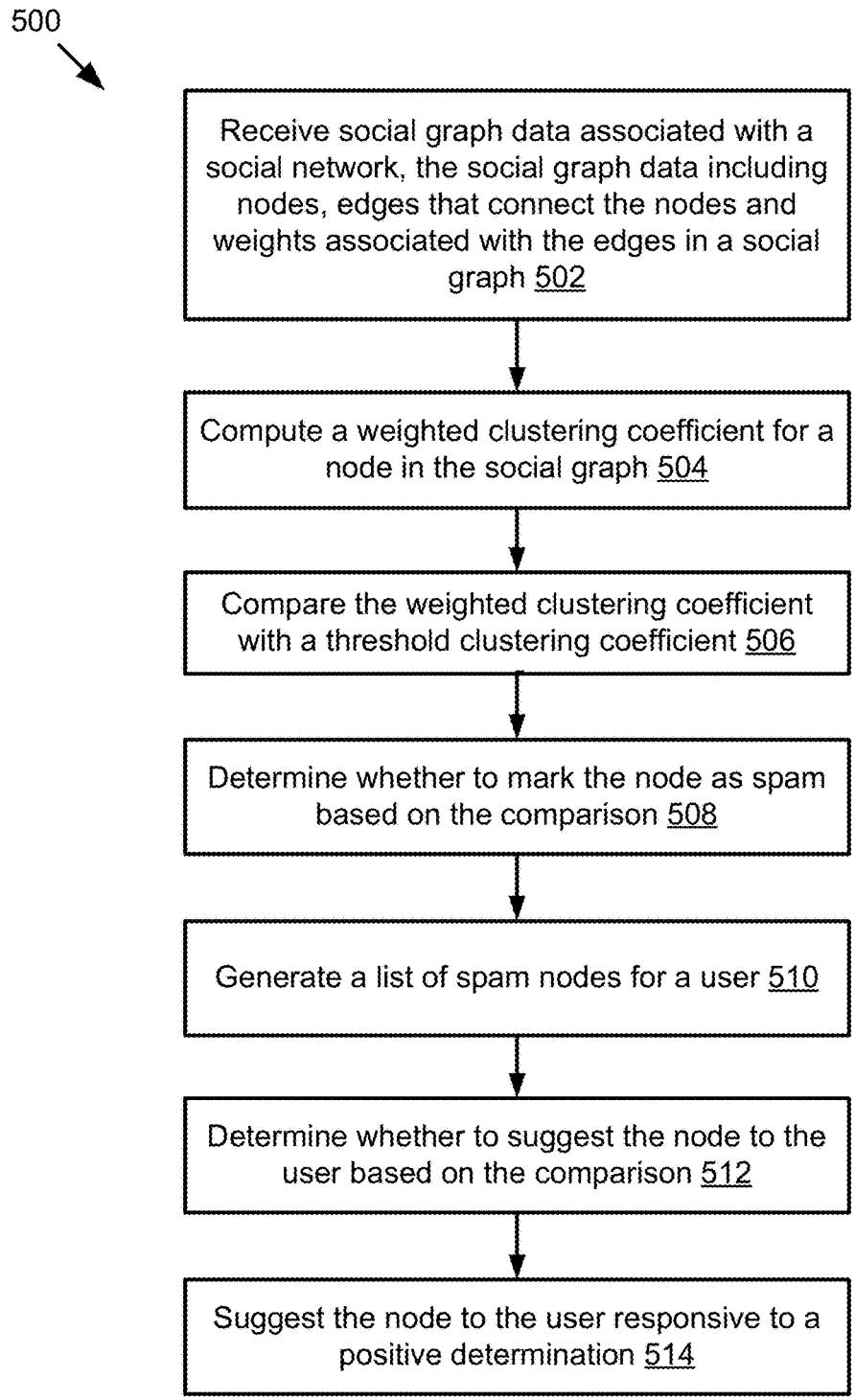
FIG. 5 is a flow diagram of an example method for applying weighted clustering coefficients in detecting spam nodes or suggesting connections to users.

FIG. 5 is a flow diagram of an example of a method 500 for applying weighted clustering coefficients in detecting spam nodes or suggesting connections to users. The measurement application 103 comprises a processing unit 201 and an aggregator 209. The processing unit receives 502 social graph data associated with a social network, the social graph data including nodes, edges that connect the nodes and weights associated with the edges in a social graph. The aggregator 209 computes 504 a weighted clustering coefficient for a node in the social graph. The aggregator 209 compares 506 the weighted clustering coefficient with a threshold clustering coefficient. The aggregator 209 determines 508 whether to mark the node as spam based on the comparison. The aggregator 209 generates 510 a list of spam nodes for a user. For example, in a social network having 114,529 hosts, 5709 hosts are marked as "non-spam" and 344 hosts are marked as "spam" manually by a group of volunteers. The aggregator 209 computes the weighted clustering coefficients for the nodes in the social network, and determines to mark 2058 hosts as "non-spam" and to mark 93 hosts as "spam" based on the weighted clustering coefficient exceeding a threshold clustering coefficient of zero (or any other measurement known to those of skill in the art). In this way, the aggregator 209 refines the detection of spam nodes.

The aggregator 209 determines 512 whether to suggest the node to the user based on the comparison. The aggregator 209 suggests 514 the node to the user responsive to a positive determination. For example, the aggregator 209 determines that the weighted clustering coefficient associated with a first node in a social network is greater than a threshold, which indicates that a tight community is formed around a first user represented by the first node. The first user may be a team leader that is in charge of an important project in a company. If two neighbors of the first node (e.g., team members) have not connected yet in the social network, the aggregator 209 suggests that they connect with each other. If a second user that is not a neighbor of the first user (e.g., a co-worker that is not in the team), the aggregator 209 suggests that the second user connect with the first user so that the second user can know more about the important project in the company.

Figure 6A:
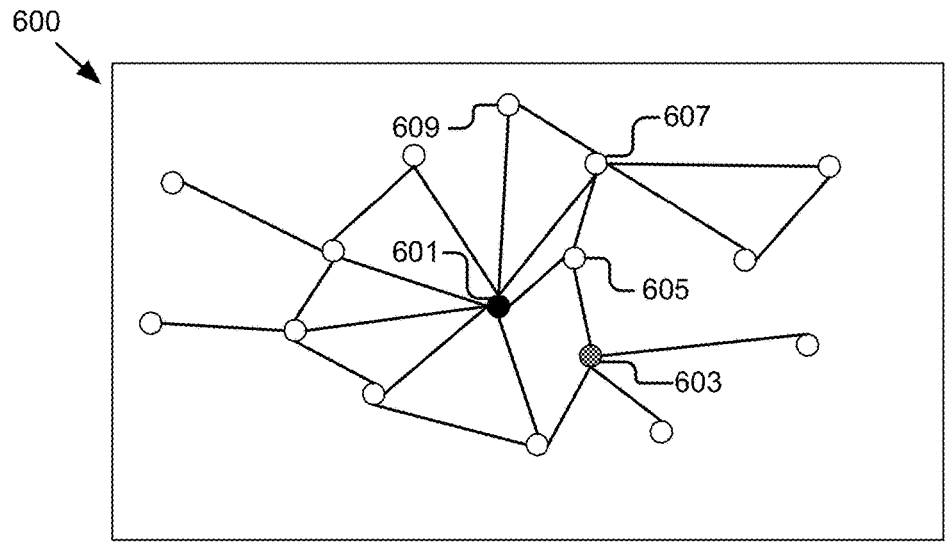
FIG. 6A is an example graph including social graph data associated with at least one node in a social network.
Figure 6B:
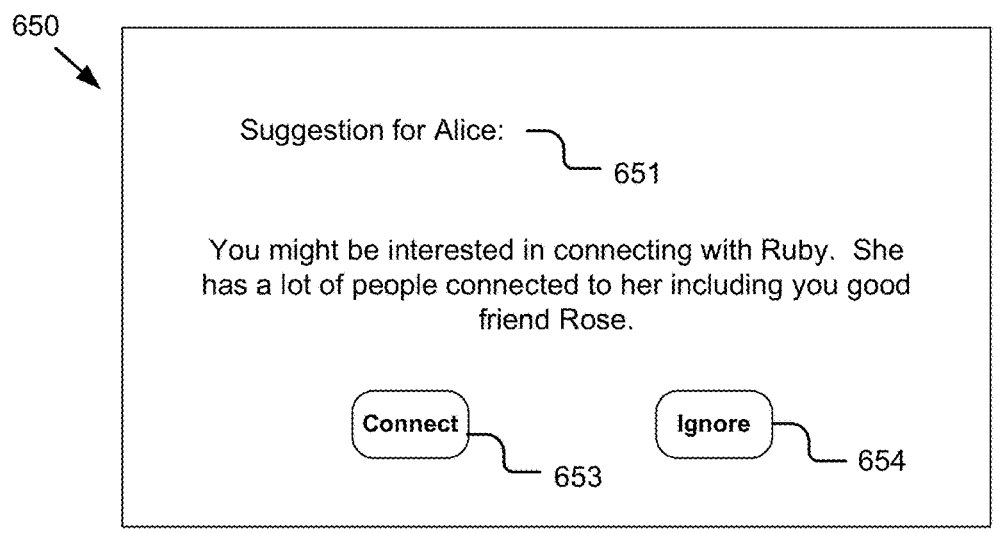
FIG. 6B is an example graphic representation of a user interface for displaying a suggested user.

FIG. 6A is an example graph 600 including social graph data associated with at least one node in a social network. The graph 600 is an undirected graph that includes at least node 601 and node 603. Node 601 connects tightly with its neighbors. For example, node 601 forms a first triangle with nodes 605, 607 and forms a second triangle with nodes 607, 609. Node 603 also connects with some neighbor nodes, for example, with node 605, but forms no triangle. The weighted clustering coefficient associated with node 601 therefore is larger than the weighted clustering coefficient associated with node 603. The aggregator 209 uses the weighted clustering coefficient in applications such as detecting spam nodes or suggesting connections to a user in the social network.

FIG. 6B is an example graphic representation of a user interface 650 for displaying a suggested user. The user interface 650 includes a suggestion 651 for Alice. The suggestion 651 includes a user Ruby that is suggested to Alice based on the weighted clustering coefficient associated with Ruby. The aggregator 209 computes a large weighted clustering coefficient associated with Ruby and determines that Ruby is a high quality user that is surrounded by a lot of users. For example, Ruby is the user represented by node 601 in FIG. 6A. The suggestion 651 tells Alice that Ruby is someone she might be interesting in connecting with and that she has a lot of connections including Alice's good friend Rose. The user interface 650 also includes a "Connect" button 653 such that Alice can connect to Ruby by a click and an "Ignore" button 654 in case Alice is uninterested in connecting with Ruby and does not want to see the suggestion again.

FIGS. 7A-7G are experimental results of a sampling algorithm for computing weighted clustering coefficient. The experiment module 213 uses a publicly available dataset composed by a collection of hosts manually labeled by a group of volunteers. The social graph is composed of 114,529 hosts in the .uk domain and there are 5709 hosts marked as "non-spam" and 344 hosts marked as "spam." In the experiments shown in FIGS. 7A-7G, the experiment module 213 implements the sampling algorithm to analyze the correlation between various definitions of the clustering coefficient. For each definition, the experiment module 213 computes the corresponding score (e.g., the weighted clustering coefficient) for each labeled node, ranks the labeled nodes with the score bigger than zero according to their scores, and computes the precision of each position i of the ranking as the percentage of "non-spam" hosts before position i. In FIGS. 7A-7G, the average precisions are depicted with lines and the standard deviations are depicted with shadows around the lines.

Figure 7A:
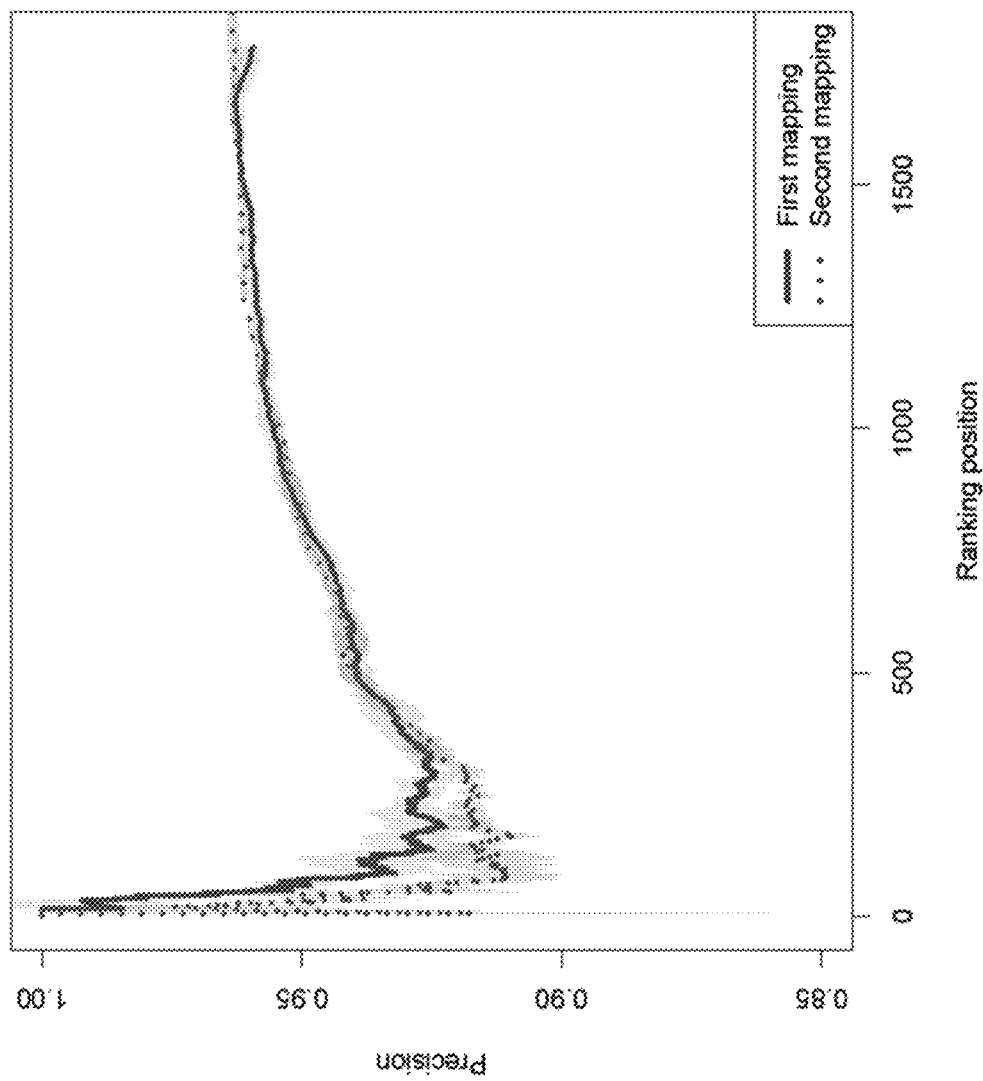
FIGS. 7A-7G are experimental results of a sampling algorithm for computing weighted clustering coefficient.

FIG. 7A shows the experiment result of applying different techniques to normalize weights associated with edges in the .uk domain graph. The experiment module 213 uses two nonlinear mapping functions M1 and M2. Both functions are mapping between $[e_w, e_W]$ to $[0, 1]$, e.g., M1, M2: $[e_w, e_W] \to [0, 1]$. To compare these two mappings, the experiment module 213 runs the sampling approximation algorithm for estimating $WC_v$ for all the nodes in the graph and compares the precision of rankings obtained based on the two different rankings. In this experiment, the experiment module 213 executes 3200 samples per node to compute the weighted clustering coefficient. To compute the average precision and the standard deviation, the experiment module 213 reruns the algorithm 4 times with different random seeds. FIG. 7A shows that the two mapping functions have similar performances. M1 (e.g., the first mapping in solid line) performs slightly better than M2 (e.g., the second mapping in dotted line). For this reason, the experiment module 213 performs the sampling algorithm using the mapping M1 and depicts the results in FIGS. 7B-7G.

Figure 7B:
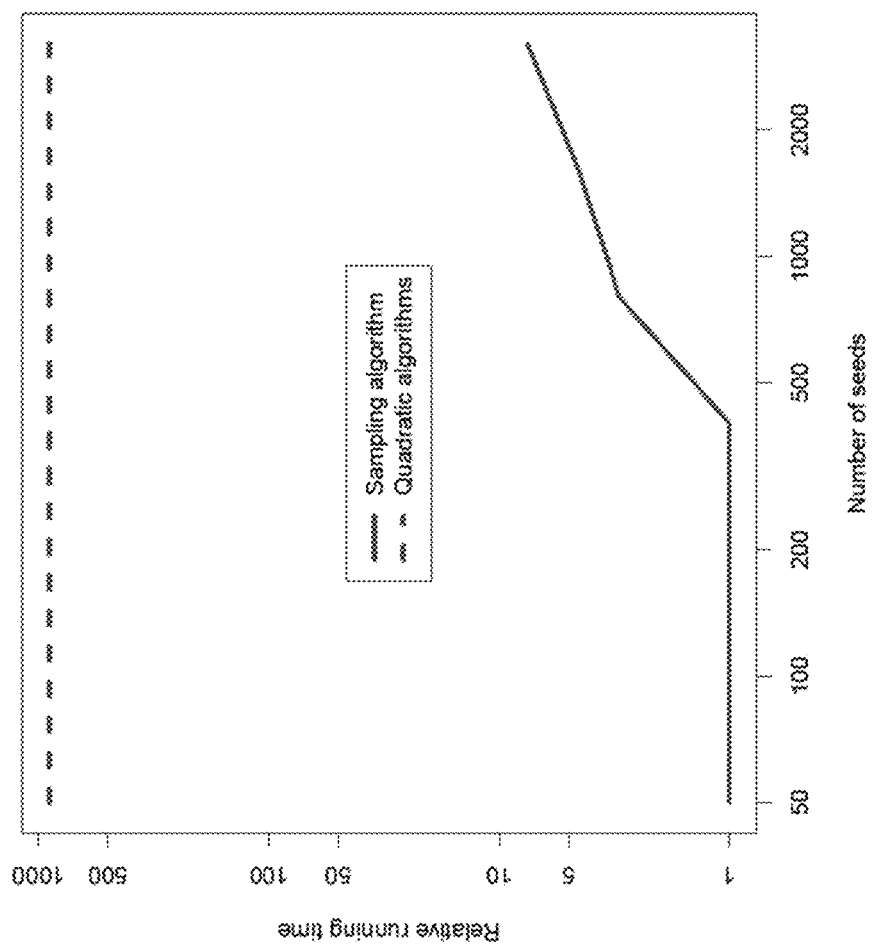

FIG. 7B shows the performance of the sampling algorithm. The experiment module 213 analyzes the running time of the sampling algorithm when the number of samples used in the algorithm varies. The experiment module 213 also compares the running time of the sampling algorithm with the running time of the algorithms that considers all the triangles to compute the unweighted clustering coefficient or the weighted clustering coefficient (e.g., the quadratic algorithms).

FIG. 7B depicts the average running time of the sampling algorithm as a function of the number of samples. Since the running time increases almost linearly with the number of seeds, the experiment module 213 implements the algorithm efficiently by using all the parallelization offered by the MapReduce framework. FIG. 7B also shows a huge difference in the running time between the sampling algorithm and the quadratic algorithm that considers all the triangles. For example, when the number of the samples is 50, 100, 200 or 400, the sampling algorithm performed by the experiment module 213 is 900 times faster than the quadratic algorithm. Even for 3200 samples, the sampling algorithm is still 120 times faster than the quadratic algorithm.

Figure 7C:
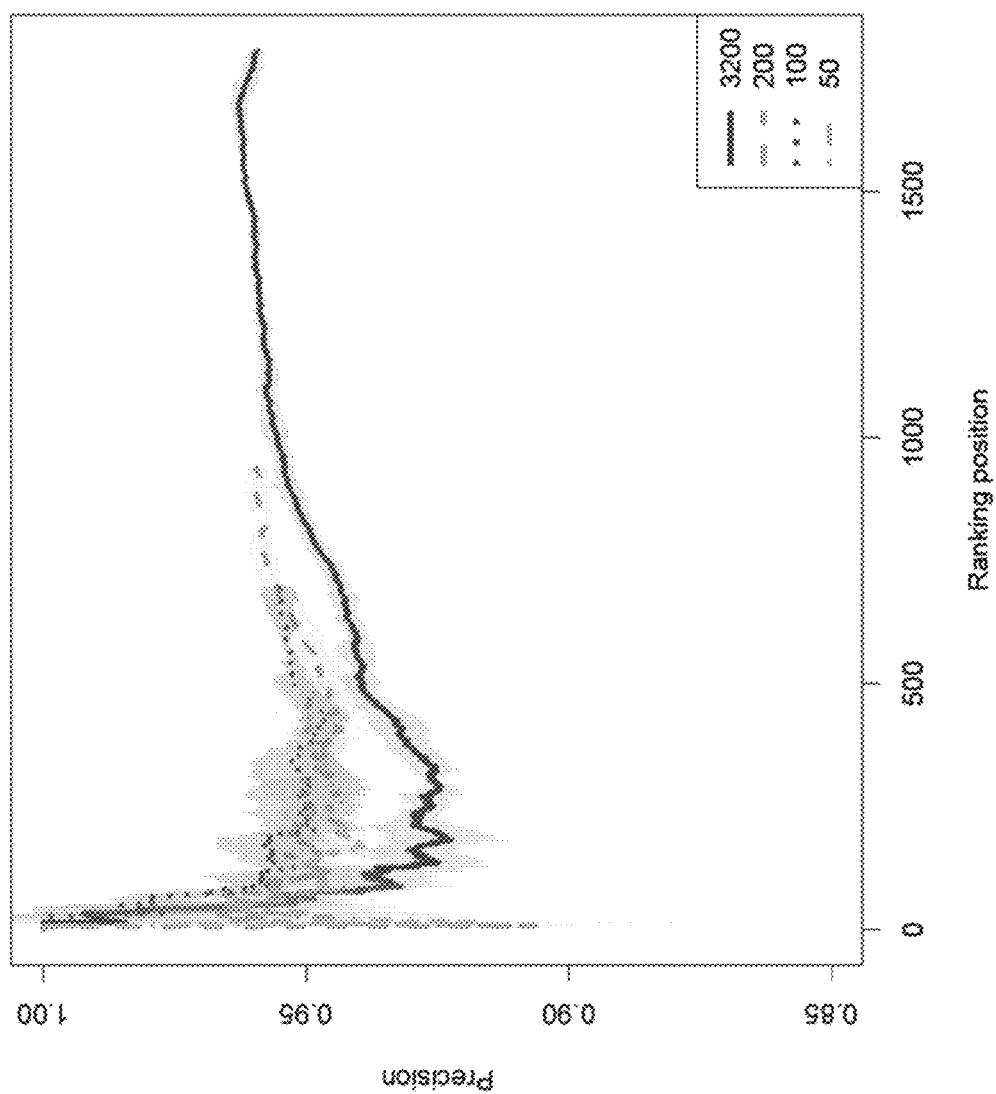

FIG. 7C shows the performance of the sampling algorithm, in particular, the effects of varying the number of samples on the precision of the algorithm. In FIG. 7C, the precision curve changes when the number of samples changes. The average precisions are depicted with lines and the standard deviations are depicted with the shadows around the lines. There are three interesting observations in FIG. 7C. First, the standard deviation decreases quickly as the number of samples increases. Second, the length of the ranking decreases when a small number of samples are used. This is because a small number of triangles formed by a small number of samples are hard to be detected. The most striking observation is that the precision of ranking decreases when the numbers of samples increases. This observation can be hypothetically explained using the same explanation in the second observation. Specifically, in this case, nodes that have small degrees are not likely to appear in the ranking when few samples are considered. However, for nodes of small degrees, the clustering coefficient is probably not a meaningful indicator of their trustfulness. To verify this hypothesis, the experiment module 213 analyzes how the precision of the rankings changes as the degrees of nodes change in FIGS. 7D and 7E.

Figure 7D:
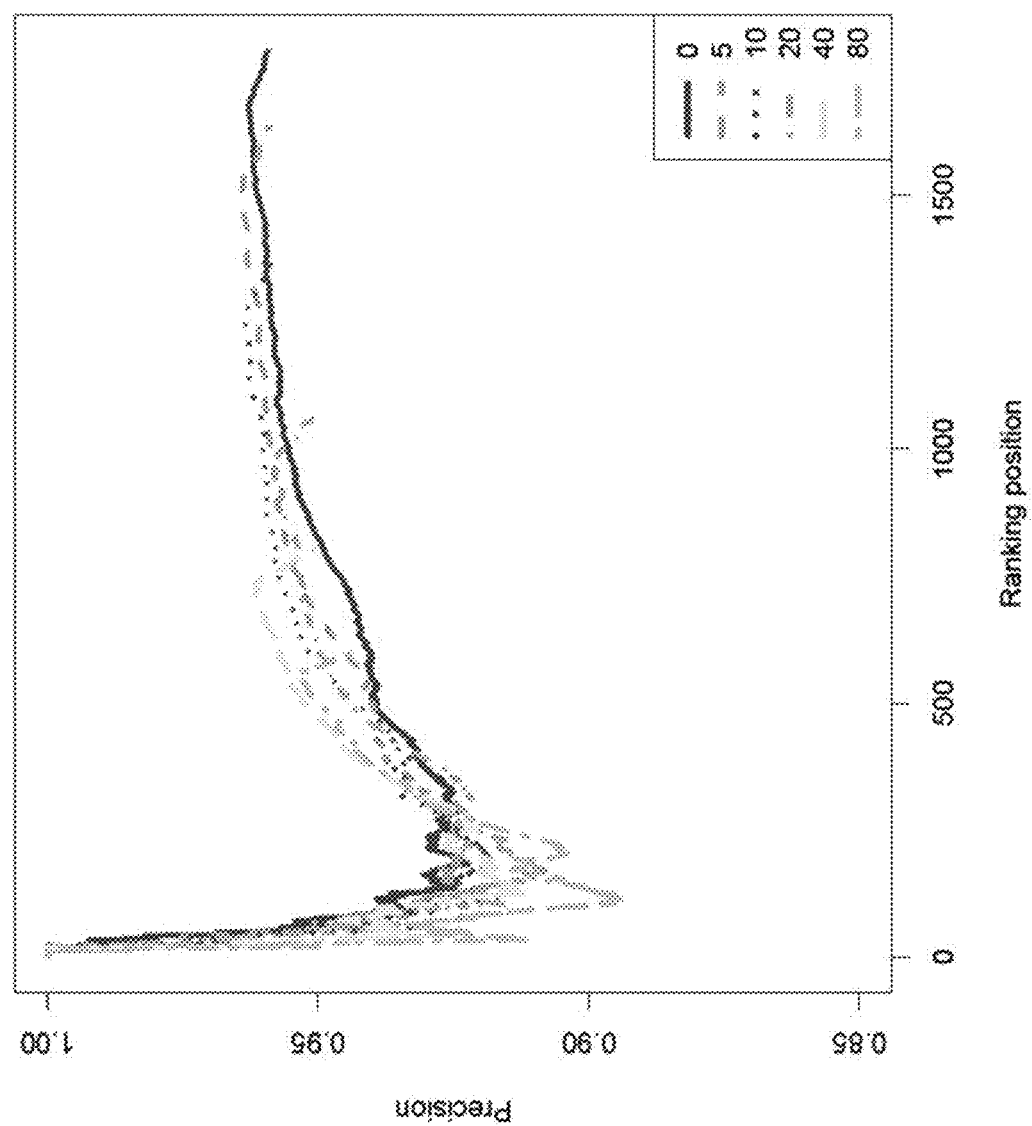
Figure 7E:
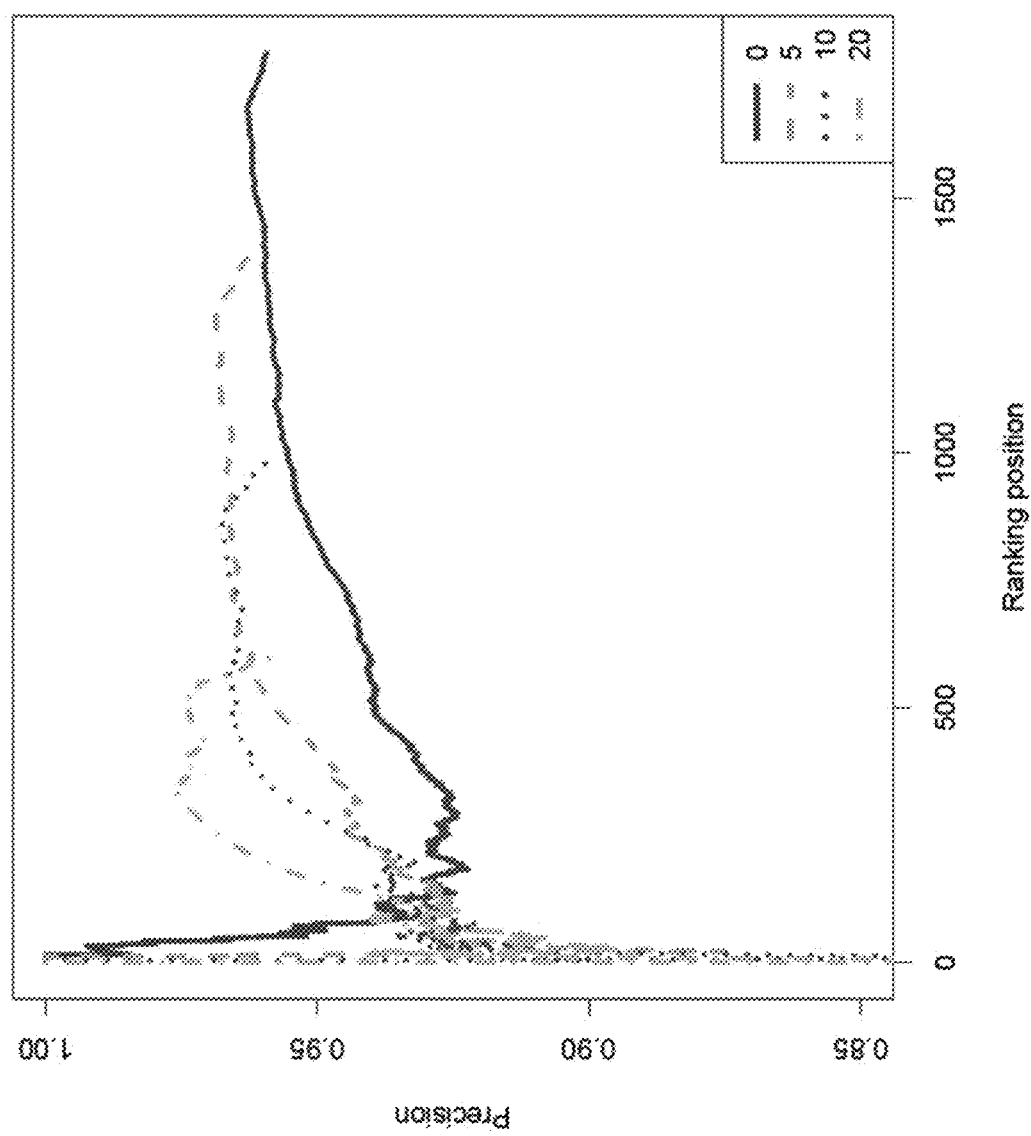

In FIGS. 7D and 7E, the experiment module 213 analyzes the relationship between the degree of a node and the correlation between its clustering coefficient and its trustfulness. In FIG. 7D, the experiment module 213 analyzes the precision of the rankings of nodes by restricting only to nodes with weighted degree above a specific threshold. Surprisingly, FIG. 7D does not show the same trend as in FIG. 7C. A possible explanation for this is the presence of nodes incident to a single relatively heavy edge. In this case, those nodes would have high weighted degree but small probability to appear in a ranking obtained with a small number of samples.

In FIG. 7E, the experiment module 213 analyzes the precision of the rankings of nodes by restricting only to nodes with unweighted degree 0, 5, 10 and 20. The sample size is 3200. FIG. 7E shows a trend similar to FIG. 7C. This result suggests that there is a relationship between the degree of a node and the correlation of its weighted clustering coefficient with its trustfulness, especially a clear relationship between unweighted degree and number of wedges incident to a node.

Figure 7F:
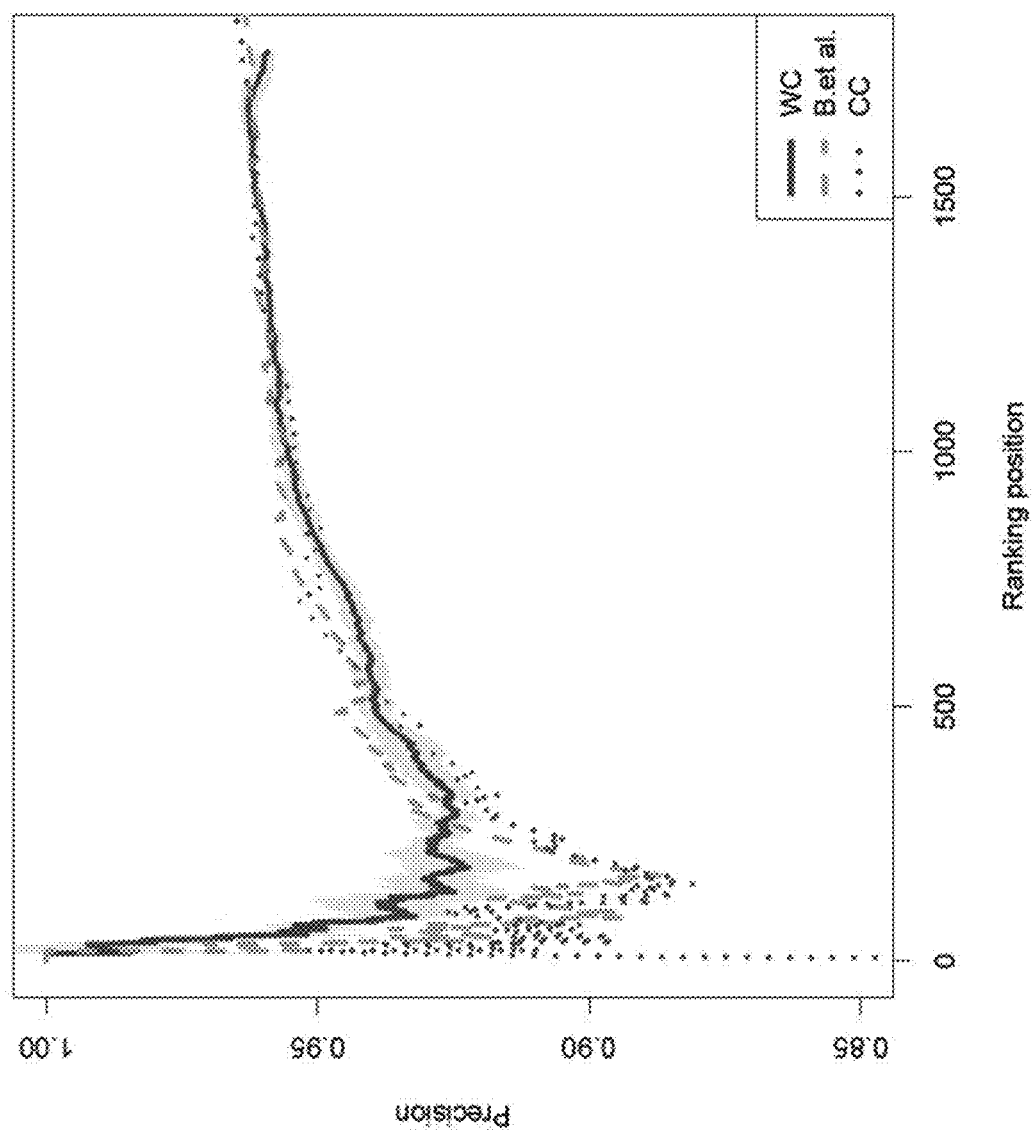
Figure 7G:
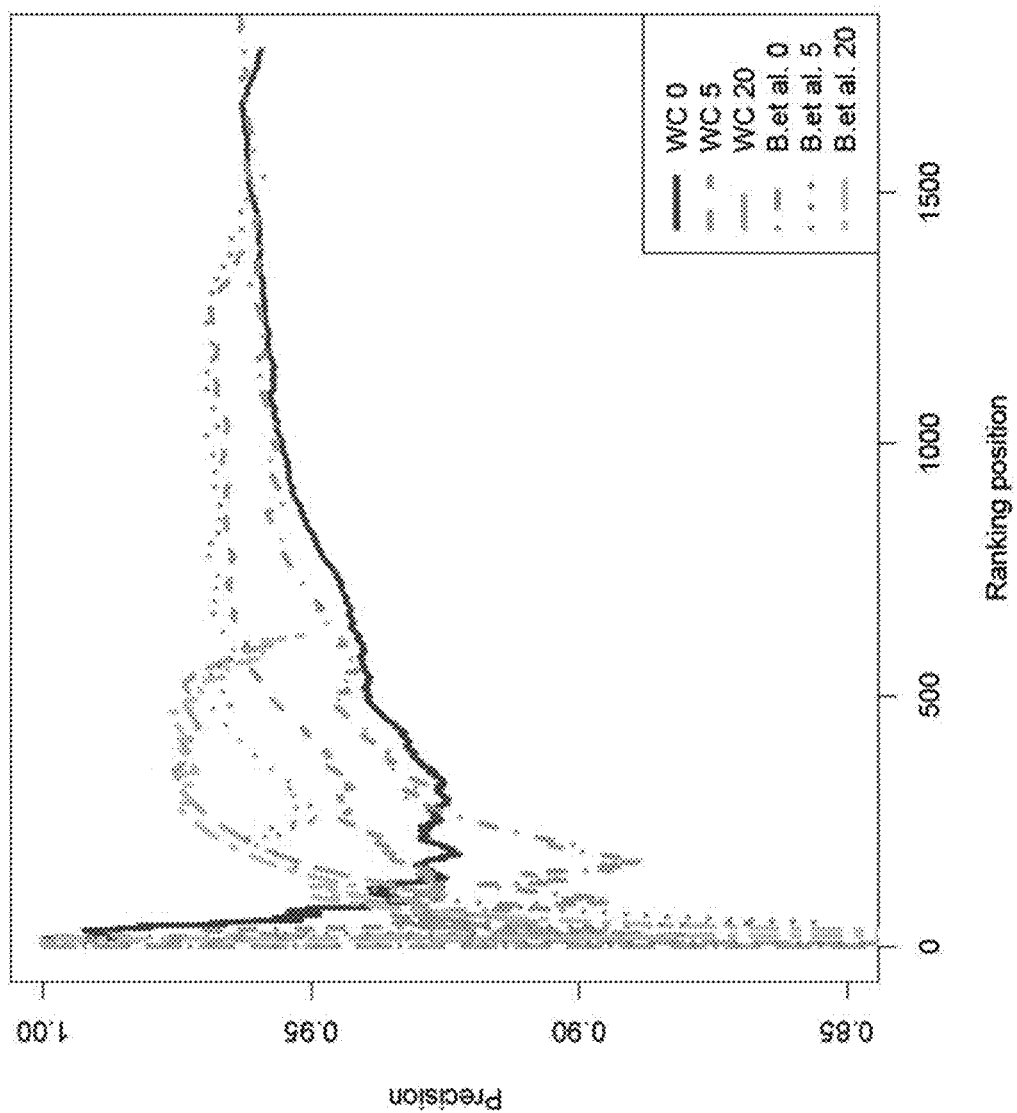

In FIGS. 7F and 7G, the experiment module 213 compares the definition of weighted clustering coefficient in Equation 1 with the definition presented in Barrat et al. and with the classic definition of unweighted clustering coefficient. Note that the definition of the weighted clustering coefficient in Barrat et al. can be found in "The architecture of complex weighted networks" published by A. Barrat et al. in "Proceeding of the National Academy of Sciences of the United States of America" in 2004. The results in FIGS. 7F and 7G indicate that the new definition in Equation 1 is comparable with the other two. In various point of the ranking, the experiment based on the new definition in Equation performs significantly better than the other two. This result is especially attractive given that, for the new definition in Equation 1, the experiment module 213 uses an approximation algorithm that is asymptotically more efficient in theory and 120 times faster in practice (as seen in FIG. 7C).

FIG. 7F shows the ranking obtained using the three definitions. For the definition introduced by Barrat et al. (e.g., the dash line labeled by "B. et al.") and for the classic definition (e.g., the dotted line labeled by "CC"), the experiment module 213 computes the exact clustering coefficient of each node. For our definition in Equation 1, the experiment module 213 approximates the clustering coefficient using 3200 samples per node. It is noted that the ranking obtained by our new definition has a higher precision for the first positions in the ranking and then has performances comparable with the rankings obtained using the other definitions.

In FIG. 7G, the experiment module 213 compares the performances of the new definition in Equation 1 with the performances of the definition given by Barrat et al. when restricting to nodes with unweighted degree above a specific threshold. This case is of particular interest because FIGS. 7D and 7E show that there is an interesting relationship between the degree of a node and the correlation between its weighted clustering coefficient and its trustfulness. In FIG. 7G, the comparison is between the two definitions with nodes of degree larger than 0, 5 and 20. FIG. 7G shows that the two definitions have very similar performances. In summary, the new definition is at least as accurate as the definition given by Barrat et al. However, since the weighted clustering coefficient with our new definition can be computed with an efficient algorithm, it is the only weighted definition that can be analyzed on large-scale social networks.

In the above description, for purposes of explanation, numerous specific details are set forth in order to provide a thorough understanding of the specification. It will be apparent, however, to one skilled in the art that the invention can be practiced without these specific details. In other instances, structures and devices are shown in block diagram form in order to avoid obscuring the description. For example, the present embodiment is described in one embodiment below primarily with reference to user interfaces and particular hardware. However, the present embodiment applies to any type of computing device that can receive data and commands, and any peripheral devices providing services.

Reference in the specification to "one embodiment" or "an embodiment" means that a particular feature, structure, or characteristic described in connection with the embodiment is included in at least one embodiment of the description. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory.

These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present embodiment of the specification also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of an entirely hardware embodiment, an entirely software embodiment or an embodiment containing both hardware and software elements. In a preferred embodiment, the specification is implemented in software, which includes but is not limited to firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions and/or formats. Furthermore, as will be apparent to one of ordinary skill in the relevant art, the modules, routines, features, attributes, methodologies, and other aspects of the disclosure can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the disclosure is in no way limited to implementation in any specific programming language, or for any specific operating system or environment. Accordingly, the disclosure is intended to be illustrative, but not limiting, of the scope of the specification, which is set forth in the following claims.

What is claimed is:

1. A computer-implemented method comprising:
   receiving, with one or more processors, social graph data associated with a social network, the social graph data including nodes, edges that connect the nodes and weights associated with the edges in a social graph;
   determining, with the one or more processors, a first probability of existence of an edge in the social graph based on the weights;
   identifying, with the one or more processors, a number of sets of neighbors for a first node;

determining, with the one or more processors, a second probability that the first node forms a triangle with a pair of neighbor nodes by computing a third probability of selecting the pair of neighbor nodes from the number of sets of neighbors based on the pair of neighbor nodes being the first two nodes in a total number of random permutations of the sets of neighbors; and computing, with the one or more processors, a weighted clustering coefficient for the first node based on the first and second probabilities.

2. The method of claim 1, wherein identifying the number of sets of neighbors includes identifying s sets of neighbors for the first node.

3. The method of claim 2, further comprising selecting a second node and a third node randomly from the s sets of neighbors, and wherein determining the second probability that the first node forms the triangle with the pair of neighbor nodes comprises determining the second probability that the first node, the second node and the third node form the triangle in the social graph.

4. The method of claim 3, wherein selecting the second node and the third node randomly from the s sets of neighbors is implemented s times.

5. The method of claim 1, further comprising normalizing the weights based on a nonlinear mapping function, and wherein determining the first probability of existence of the edge in the social graph is based on the normalized weights.

6. The method of claim 1, further comprising comparing the weighted clustering coefficient with a threshold clustering coefficient.

7. The method of claim 6, further comprising:
determining whether to mark the first node as spam based on the comparison; and
generating a list of spam nodes for a user.

8. The method of claim 6, further comprising:
determining whether to suggest the first node to a user based on the comparison; and
suggesting the first node to the user responsive to a positive determination.

9. A system comprising:
one or more processors;
a processing unit stored on a memory and executable by the one or more processors, the processing unit configured to receive social graph data associated with a social network, the social graph data including nodes, edges that connect the nodes and weights associated with the edges in a social graph;
a normalization module coupled to the processing unit and configured to determine a first probability of existence of an edge in the social graph based on the weights;
a triangle counter coupled to the processing unit and configured to identify a number of sets of neighbors for a first node, and determine a second probability that the first node forms a triangle with a pair of neighbor nodes by computing a third probability of selecting the pair of neighbor nodes from the number of sets of neighbors based on the pair of neighbor nodes being the first two nodes in a total number of random permutations of the sets of neighbors; and
an aggregator coupled to the normalization module and the triangle counter and configured to compute a weighted clustering coefficient for the first node based on the first and second probabilities.

10. The system of claim 9, wherein the triangle counter identifies the number of sets of neighbor nodes by identifying s sets of neighbors for the first node.

11. The system of claim 10, wherein the triangle counter is further configured to select a second node and a third node randomly from the s sets of neighbors, and wherein determining the second probability that the first node forms the triangle with the pair of neighbor nodes comprises determining the second probability that the first node, the second node and the third node form the triangle in the social graph.

12. The system of claim 11, wherein selecting the second node and the third node randomly from the s sets of neighbors is implemented s times.

13. The system of claim 9, wherein the normalization module is further configured to normalize the weights based on a nonlinear mapping function, and wherein determining the first probability of existence of the edge in the social graph is based on the normalized weights.

14. The system of claim 9, further comprising an experiment module coupled to the processing unit and configured to compare the weighted clustering coefficient with a threshold clustering coefficient.

15. The system of claim 14, wherein the experiment module is further configured to:
determine whether to mark the first node as spam based on the comparison; and
generate a list of spam nodes for a user.

16. The system of claim 14, wherein the experiment module is further configured to:
determine whether to suggest the first node to a user based on the comparison; and
suggest the first node to the user responsive to a positive determination.

17. A computer program product comprising a non-transitory computer useable medium including a computer readable program, wherein the computer readable program when executed on a computer causes the computer to:
receive social graph data associated with a social network, the social graph data including nodes, edges that connect the nodes and weights associated with the edges in a social graph;
determine a first probability of existence of an edge in the social graph based on the weights;
identify a number of sets of neighbors for a first node;
determine a second probability that the first node forms a triangle with a pair of neighbor nodes by computing a third probability of selecting the pair of neighbor nodes from the number of sets of neighbors based on the pair of neighbor nodes being the first two nodes in a total number of random permutations of the sets of neighbors; and
compute a weighted clustering coefficient for the first node based on the first and second probabilities.

18. The computer program product of claim 17, wherein the computer readable program when executed on the computer further causes the computer to identify the number of sets of neighbors by identifying s sets of neighbors for the first node.

19. The computer program product of claim 18, wherein the computer readable program when executed on the computer further causes the computer to select a second node and a third node randomly from the s sets of neighbors, and wherein determining the second probability that the first node forms the triangle with the pair of neighbor nodes comprises determining the second probability that the first node, the second node and the third node form the triangle in the social graph.

20. The computer program product of claim 19, wherein selecting the second node and the third node randomly from the s sets of neighbors is implemented s times.

\* \* \* \* \*